United States Patent
John et al.

(10) Patent No.: US 12,215,555 B2
(45) Date of Patent: Feb. 4, 2025

(54) SYSTEMS AND METHODS FOR OPERATING CANDLE FILTERS TO RECOVER GLYCOLS FROM DRILLING OPERATIONS

(71) Applicant: Saudi Arabian Oil Company, Dhahran (SA)

(72) Inventors: Jithin Mathew John, Al Jubail (SA); Zayed Ghazai Alotaibi, Jeddah (SA)

(73) Assignee: Saudi Arabian Oil Company, Dhahran (SA)

( * ) Notice: Subject to any disclaimer, the term of this patent is extended or adjusted under 35 U.S.C. 154(b) by 87 days.

(21) Appl. No.: 18/187,228

(22) Filed: Mar. 21, 2023

(65) Prior Publication Data
US 2024/0318514 A1    Sep. 26, 2024

(51) Int. Cl.
| | |
|---|---|
| *E21B 21/06* | (2006.01) |
| *B01D 29/15* | (2006.01) |
| *B01D 29/52* | (2006.01) |
| *B01D 29/66* | (2006.01) |
| *B01D 29/94* | (2006.01) |
| *B01D 37/04* | (2006.01) |

(52) U.S. Cl.
CPC ............ *E21B 21/065* (2013.01); *B01D 29/15* (2013.01); *B01D 29/52* (2013.01); *B01D 29/66* (2013.01); *B01D 29/94* (2013.01); *B01D 37/046* (2013.01); *B01D 2201/086* (2013.01); *B01D 2221/04* (2013.01)

(58) Field of Classification Search
None
See application file for complete search history.

(56) References Cited

U.S. PATENT DOCUMENTS

| | | | | | |
|---|---|---|---|---|---|
| 1,922,315 | A | * | 8/1933 | Mooz ................... | B01D 29/46 |
| | | | | | 210/488 |
| 2,423,172 | A | * | 7/1947 | Booth ................... | B01D 29/33 |
| | | | | | 210/411 |
| 2,468,603 | A | * | 4/1949 | Pew ...................... | B01D 29/114 |
| | | | | | 210/323.2 |

(Continued)

OTHER PUBLICATIONS

BHS Sonthofen, "Transforming Materials into Value", https://www.bhs-sonthofen.com/en/process-technology/machines/filters/candle-filter-cf, accessed Oct. 11, 2022.

*Primary Examiner* — Robert J Popovics
(74) *Attorney, Agent, or Firm* — DINSMORE & SHOHL LLP

(57) ABSTRACT

Methods of operating candle filter systems for removing solids from MEG recovered from drilling fluids include passing an MEG rich stream to a candle filter system comprising a plurality of candle filter units in parallel, determining a concentration of TDS in the MEG rich stream, determining whether to operate the candle filter system in a low TDS mode or a high TDS mode based on the concentration of TDS the MEG rich stream, filtering the MEG rich stream in the plurality of candle filter units to produce a filtrate and a filter cake, determining to conduct a cleaning cycle of the candle filter units based on a pressure differential, and conducting a cleaning cycle to remove the filter cake from the outer surfaces of the filter candles. The cleaning cycle is modified to improve removal of solids from the filter candles of the candle filter units.

20 Claims, 5 Drawing Sheets

(56) References Cited

U.S. PATENT DOCUMENTS

| | | | | |
|---|---|---|---|---|
| 2,475,561 A * | 7/1949 | Cooperider et al. | ... | B01D 33/21 210/324 |
| 2,562,699 A * | 7/1951 | Cooperson | ............ | B01D 37/02 210/411 |
| 2,693,882 A * | 11/1954 | Ebert | ..................... | B01D 29/52 210/345 |
| 2,710,099 A * | 6/1955 | Kalinske | ................ | B01D 29/48 210/323.2 |
| 2,731,107 A * | 1/1956 | Hersey, Jr. | ............. | B01D 29/15 55/284 |
| 2,744,632 A * | 5/1956 | Gardes | .................. | B01D 29/54 210/323.2 |
| 2,780,363 A * | 2/1957 | Pew | ...................... | B01D 29/66 210/411 |
| 2,784,846 A * | 3/1957 | Ebert | ..................... | B01D 29/52 210/456 |
| 2,862,622 A * | 12/1958 | Jones | .................... | B01D 29/66 210/411 |
| 2,872,044 A * | 2/1959 | Kasten | .................. | B01D 25/00 210/488 |
| 2,889,933 A * | 6/1959 | Brundage | ............. | B01D 29/52 210/323.2 |
| 2,901,115 A * | 8/1959 | Ledford | ................ | B01D 35/16 210/785 |
| 2,909,285 A * | 10/1959 | Besler | ................... | B01D 29/94 210/330 |
| 2,914,179 A * | 11/1959 | Foust | .................... | B01D 29/52 210/493.1 |
| 3,034,652 A * | 5/1962 | Hobson, Jr. | ............ | B01D 29/52 210/232 |
| 3,042,214 A * | 7/1962 | Arvanitakis | ........... | B01D 35/16 210/330 |
| 3,050,858 A * | 8/1962 | Giesse | ................... | B01D 35/14 210/86 |
| 3,055,290 A * | 9/1962 | Arvanitakis | ....... | B01D 33/0183 210/407 |
| 3,100,190 A * | 8/1963 | Hobson, Jr. | ............ | B01D 29/52 210/497.1 |
| 3,155,613 A * | 11/1964 | Felix | ..................... | B01D 35/20 210/232 |
| 3,169,109 A * | 2/1965 | Hirs | ....................... | B01D 35/12 210/138 |
| 3,204,766 A * | 9/1965 | Schmidt, Jr. | ......... | B01D 29/606 210/90 |
| 3,212,643 A * | 10/1965 | Zievers | .................. | B01D 29/72 55/300 |
| 3,225,933 A * | 12/1965 | Berline | ................. | B01D 29/15 40/518 |
| 3,262,568 A * | 7/1966 | Zehrbach | ............. | B01D 29/114 210/138 |
| 3,279,608 A * | 10/1966 | Levendusky | .......... | B01D 29/52 210/232 |
| 3,280,978 A * | 10/1966 | Winfield | .............. | B01D 29/885 210/408 |
| 3,280,980 A * | 10/1966 | King | .................... | B01D 29/668 55/284 |
| 3,291,310 A * | 12/1966 | Marvel | .................. | B01D 29/21 210/167.13 |
| 3,310,175 A * | 3/1967 | McLagan | ................ | B01D 37/02 55/296 |
| 3,312,352 A * | 4/1967 | Shiells | ................. | B01D 29/114 210/323.2 |
| 3,319,793 A * | 5/1967 | Miller, Jr. | ............. | B01D 29/902 210/243 |
| 3,356,215 A * | 12/1967 | Miles, Jr. | ................ | B01D 37/04 210/333.1 |
| 3,394,532 A * | 7/1968 | Octiker | ................ | F16K 31/385 55/467 |
| 3,394,815 A * | 7/1968 | Harms | .................. | B01D 29/52 210/457 |
| 3,405,807 A * | 10/1968 | Burkhardt | ............ | B01D 29/96 210/232 |
| 3,416,669 A * | 12/1968 | Hubbard | ............... | B01D 29/668 210/411 |
| 3,422,958 A * | 1/1969 | Newman | ................ | B01D 35/16 210/457 |
| 3,438,502 A * | 4/1969 | Borre | ..................... | B01D 29/19 210/232 |
| 3,447,690 A * | 6/1969 | Kracklauer | ........ | B01D 29/6484 55/299 |
| 3,482,700 A * | 12/1969 | Bebech | .................. | B01D 29/72 210/407 |
| 3,556,304 A * | 1/1971 | Collard | .................. | B01D 37/02 210/489 |
| 3,568,845 A * | 3/1971 | Llamas | .................. | B01D 29/46 210/488 |
| 3,623,910 A * | 11/1971 | Calhoun et al. | ........ | B01D 46/70 96/228 |
| 3,633,753 A * | 1/1972 | Petitjean | ................ | B01D 29/66 55/288 |
| 3,637,079 A * | 1/1972 | Strub | ..................... | B01D 29/94 210/794 |
| 3,642,141 A * | 2/1972 | Hobson, Jr. | ............ | B01D 29/15 210/457 |
| 3,666,097 A * | 5/1972 | Ryan | ..................... | B01D 29/661 210/333.01 |
| 3,744,633 A * | 7/1973 | Schmidt, Jr. | ........... | B01D 29/94 210/785 |
| 3,750,889 A * | 8/1973 | Acosta | ................... | B01D 29/52 210/499 |
| 3,796,316 A * | 3/1974 | Matz | ...................... | B01D 29/52 100/116 |
| 3,834,535 A * | 9/1974 | Portyrata | ............... | B01D 29/15 210/108 |
| 3,867,291 A * | 2/1975 | Schmidt, Jr. | ........... | B01D 29/39 55/300 |
| 3,891,551 A * | 6/1975 | Tiedemann | ........... | B01D 29/661 210/323.1 |
| 4,051,033 A * | 9/1977 | Blace | ..................... | B01D 29/23 210/483 |
| 4,064,049 A * | 12/1977 | Calvano | ................ | B01D 29/925 210/441 |
| 4,089,781 A * | 5/1978 | Asp | ........................ | B01D 29/52 210/411 |
| 4,094,784 A * | 6/1978 | Hirano | ................... | B01D 33/52 210/780 |
| 4,163,724 A * | 8/1979 | Muller | ................. | B01D 29/114 210/334 |
| 4,201,674 A * | 5/1980 | Schwinghammer | ....................... B01D 29/114 210/411 |
| 4,213,861 A * | 7/1980 | Muller | ................. | B01D 29/114 210/797 |
| 4,217,700 A * | 8/1980 | Muller | ................. | B01D 29/114 210/771 |
| 4,243,533 A * | 1/1981 | Savolainen | ............ | B01D 29/54 210/309 |
| 4,246,114 A * | 1/1981 | Krebs | ................... | C02F 3/1242 210/220 |
| 4,264,445 A * | 4/1981 | Lumikko | ................ | B01D 29/66 210/323.2 |
| 4,265,771 A * | 5/1981 | Lennartz | ................ | B01D 29/72 210/791 |
| 4,277,349 A * | 7/1981 | Schwinghammer | ....................... B01D 29/114 134/113 |
| 4,289,630 A * | 9/1981 | Schmidt, Jr. | ......... | B01D 29/843 55/300 |
| 4,293,414 A * | 10/1981 | Gianneli | ................ | B01D 37/02 210/323.2 |
| 4,297,115 A * | 10/1981 | Johnson, Jr. | ........... | B01D 46/06 55/379 |
| 4,324,571 A * | 4/1982 | Johnson, Jr. | ....... | B01D 46/0041 55/379 |
| 4,388,197 A * | 6/1983 | Lumikko | ................ | B01D 29/114 162/189 |
| 4,433,986 A * | 2/1984 | Borst | ....................... | B01D 46/04 96/428 |

(56) References Cited

U.S. PATENT DOCUMENTS

| | | | | |
|---|---|---|---|---|
| 4,436,633 A * | 3/1984 | Robinsky | B01D 29/44 | 210/791 |
| 4,439,327 A * | 3/1984 | Muller | B01D 29/114 | 210/791 |
| 4,443,346 A * | 4/1984 | Muller | B01D 29/668 | 210/791 |
| 4,446,030 A * | 5/1984 | Schmidt, Jr. | B01D 29/52 | 210/120 |
| 4,473,472 A * | 9/1984 | Muller | B01D 29/92 | 210/458 |
| 4,488,965 A * | 12/1984 | Muller | B01D 29/15 | 55/374 |
| 4,511,471 A * | 4/1985 | Muller | B01D 29/114 | 210/333.1 |
| 4,517,086 A * | 5/1985 | Romey | B01D 29/72 | 210/334 |
| 4,526,688 A * | 7/1985 | Schmidt, Jr | B01D 29/15 | 210/489 |
| 4,528,103 A * | 7/1985 | Spilkin | B01D 29/52 | 210/779 |
| 4,547,296 A * | 10/1985 | Sim | B01D 29/114 | 210/323.2 |
| 4,552,669 A * | 11/1985 | Sekellick | B01D 29/35 | 210/323.2 |
| 4,560,483 A * | 12/1985 | Warning | B01D 29/668 | 210/489 |
| 4,578,197 A * | 3/1986 | Muller | B01D 29/605 | 210/333.1 |
| 4,584,003 A * | 4/1986 | Oda | B01D 46/0042 | 55/341.2 |
| 4,591,446 A * | 5/1986 | Muller | B01D 29/52 | 261/76 |
| 4,592,847 A * | 6/1986 | Schumacher | B01D 29/80 | 210/186 |
| 4,604,201 A * | 8/1986 | Muller | B01D 29/19 | 210/323.2 |
| 4,609,462 A * | 9/1986 | Flynn | B01D 29/52 | 210/232 |
| 4,650,580 A * | 3/1987 | Schumacher | B01D 29/111 | 427/244 |
| 4,652,369 A * | 3/1987 | DePolo | B01D 29/21 | 210/356 |
| 4,680,038 A * | 7/1987 | Titus | B01D 29/908 | 55/380 |
| 4,704,210 A * | 11/1987 | Boze | B01D 35/12 | 210/497.1 |
| 4,804,481 A * | 2/1989 | Lennartz | B01D 29/52 | 210/791 |
| 4,830,747 A * | 5/1989 | Kubota | B01D 29/66 | 134/22.12 |
| 4,865,627 A * | 9/1989 | Dewitz | B01D 46/46 | 95/286 |
| 4,872,981 A * | 10/1989 | Hobson, Jr. | B01D 29/90 | 210/420 |
| 4,919,801 A * | 4/1990 | Hobson, Jr. | B01D 35/153 | 210/388 |
| 4,943,379 A * | 7/1990 | Boze | B01D 37/02 | 210/411 |
| 4,963,271 A * | 10/1990 | Raehse | B01D 29/78 | 210/772 |
| 5,017,241 A * | 5/1991 | Ryan | B01D 29/52 | 210/791 |
| 5,062,965 A * | 11/1991 | Bernou | B01D 29/72 | 210/785 |
| 5,062,968 A * | 11/1991 | Warning | B01D 29/668 | 210/93 |
| 5,084,176 A * | 1/1992 | Davis | B01D 33/0315 | 209/381 |
| 5,085,997 A * | 2/1992 | Muller | C12H 1/063 | 210/791 |
| 5,114,596 A * | 5/1992 | Laterra | B01D 29/114 | 134/22.12 |
| 5,209,844 A * | 5/1993 | Zievers | B01D 29/114 | 210/411 |
| 5,223,012 A * | 6/1993 | Best | B01D 46/60 | 55/381 |
| 5,223,138 A * | 6/1993 | Zievers | B28B 1/265 | 162/152 |
| 5,227,076 A * | 7/1993 | Bogen | B01D 29/66 | 210/791 |
| 5,230,131 A * | 7/1993 | Hobson, Jr. | B01D 29/96 | 29/402.06 |
| 5,279,733 A * | 1/1994 | Heymans | B01D 29/96 | 210/485 |
| 5,296,010 A * | 3/1994 | Clark | B01D 46/4227 | 55/DIG. 30 |
| 5,358,552 A * | 10/1994 | Seibert | B01D 46/79 | 95/281 |
| 5,384,034 A * | 1/1995 | Hetzel | B01D 29/52 | 210/418 |
| 5,401,406 A * | 3/1995 | Johnson | B01D 29/66 | 210/450 |
| 5,407,570 A * | 4/1995 | Hobson, Jr. | B01D 29/15 | 210/232 |
| 5,421,845 A * | 6/1995 | Gregg | B01D 46/04 | 55/294 |
| 5,437,788 A * | 8/1995 | Geibel | B01D 29/661 | 210/411 |
| 5,441,633 A * | 8/1995 | Schewitz | B01D 29/908 | 210/323.2 |
| 5,474,586 A * | 12/1995 | Eaton | B01D 29/33 | 55/378 |
| 5,494,591 A * | 2/1996 | Stamm | B01D 29/114 | 210/791 |
| 5,498,349 A * | 3/1996 | Kurahashi | B01D 29/606 | 210/411 |
| 5,518,609 A * | 5/1996 | Karlsson | B01D 29/15 | 210/97 |
| 5,525,221 A * | 6/1996 | Hohle | B01D 29/15 | 210/323.2 |
| 5,578,208 A * | 11/1996 | Miki | B01D 29/21 | 210/493.5 |
| 5,628,916 A * | 5/1997 | Stevens | B01D 29/52 | 210/799 |
| 5,639,369 A * | 6/1997 | Bowlsbey | B01D 29/15 | 210/497.2 |
| 5,667,679 A * | 9/1997 | Bozenmayer | B01D 29/52 | 210/232 |
| 5,766,467 A * | 6/1998 | Rech | B01D 29/15 | 55/508 |
| 5,766,486 A * | 6/1998 | Cathcart | B01D 46/70 | 210/791 |
| 5,785,870 A * | 7/1998 | Davis | B01D 29/48 | 210/488 |
| 5,792,353 A * | 8/1998 | Jungi | B01D 29/48 | 210/357 |
| 5,800,580 A * | 9/1998 | Feldt | B01D 46/06 | 55/378 |
| 5,849,375 A * | 12/1998 | Smith | B01D 39/2086 | 428/34.5 |
| 5,858,217 A * | 1/1999 | Redl | B01D 29/52 | 210/414 |
| 5,876,471 A * | 3/1999 | Lippert | B01D 46/58 | 55/508 |
| 5,948,257 A * | 9/1999 | Custer | B01D 46/2407 | 210/508 |
| 5,972,228 A * | 10/1999 | Ingelman | B01D 29/925 | 210/333.1 |
| 6,004,465 A * | 12/1999 | Uhr | B01D 29/33 | 210/651 |
| 6,041,944 A * | 3/2000 | Meier | B01D 29/925 | 210/489 |
| 6,102,212 A * | 8/2000 | Strid | B01D 29/15 | 210/488 |
| 6,123,746 A * | 9/2000 | Alvin | B01D 46/2407 | 277/633 |
| 6,365,054 B1 * | 4/2002 | Kruger | B01D 29/52 | 210/411 |

(56) References Cited

U.S. PATENT DOCUMENTS

| | | | | |
|---|---|---|---|---|
| 6,387,271 B1* | 5/2002 | Geibel | B01D 39/1692 | 210/500.36 |
| 6,398,837 B1* | 6/2002 | Alvin | B01D 39/2075 | 55/486 |
| 6,413,422 B1* | 7/2002 | Schumacher | B01D 29/114 | 210/232 |
| 6,419,842 B1* | 7/2002 | Kupka | F26B 7/00 | 210/330 |
| 6,428,593 B1* | 8/2002 | Bruck | B01D 46/0002 | 55/482 |
| 6,439,273 B1* | 8/2002 | Kruger | B01D 29/114 | 141/69 |
| 6,576,146 B2* | 6/2003 | Fry | B01D 29/33 | 210/791 |
| 6,709,586 B2* | 3/2004 | Mason | B01D 29/96 | 210/411 |
| 6,860,394 B1* | 3/2005 | Mueller | B01D 29/66 | 210/489 |
| 6,872,310 B2* | 3/2005 | Trotzki | B01D 29/52 | 210/345 |
| 6,875,346 B2* | 4/2005 | Fox | B01D 29/96 | 210/493.1 |
| 6,981,516 B1* | 1/2006 | VanOsdol | F16K 15/04 | 137/550 |
| 7,063,790 B2* | 6/2006 | Hahn | B01D 29/48 | 210/497.1 |
| 7,077,968 B2* | 7/2006 | Pfeiffer | B01D 36/04 | 210/803 |
| 7,381,323 B2* | 6/2008 | Umezawa | B01D 29/114 | 210/791 |
| 7,487,875 B2* | 2/2009 | Zimmerman | B01D 29/15 | 210/345 |
| 7,981,293 B2* | 7/2011 | Powell | B01D 61/18 | 210/534 |
| 7,998,353 B2* | 8/2011 | Vandendijk | B01D 29/15 | 210/232 |
| 8,029,680 B2* | 10/2011 | Shinoda | B01D 29/48 | 210/777 |
| 8,187,352 B2* | 5/2012 | Schumann | B01D 46/08 | 55/378 |
| 8,192,617 B2* | 6/2012 | Powell | C02F 9/00 | 210/197 |
| 8,303,682 B2* | 11/2012 | Nowak | B01D 46/06 | 95/1 |
| 8,303,688 B2* | 11/2012 | Sharma | B01D 46/2407 | 210/167.04 |
| 8,309,711 B2* | 11/2012 | Wiley | B01D 29/94 | 210/411 |
| 8,409,429 B2* | 4/2013 | Kaske | B01D 29/908 | 210/411 |
| 8,465,654 B2* | 6/2013 | Leonard | B01D 29/15 | 210/232 |
| 9,133,086 B2* | 9/2015 | Bussell | B01D 63/16 | |
| 9,221,003 B2* | 12/2015 | Schumann | B01D 46/06 | |
| 9,469,585 B2* | 10/2016 | Bussell | C10L 3/107 | |
| 9,725,388 B2* | 8/2017 | Bussell | C07C 29/76 | |
| 9,770,685 B2* | 9/2017 | Krueger | B01D 46/71 | |
| 10,406,458 B1* | 9/2019 | Nehlen, III | B01D 29/15 | |
| 10,814,255 B1* | 10/2020 | Nehlen, III | B01D 29/90 | |
| 10,814,256 B1* | 10/2020 | Nehlen, III | B01D 29/17 | |
| 10,850,216 B1* | 12/2020 | Nehlen, III | B01D 37/02 | |
| 10,946,315 B2* | 3/2021 | Hensel | B01D 29/085 | |
| 10,981,091 B1* | 4/2021 | Nehlen, III | B01D 29/52 | |
| 11,065,566 B2* | 7/2021 | Nehlen, III | B01D 29/96 | |
| 11,148,071 B2* | 10/2021 | Kelsey | B01D 17/045 | |
| 11,167,226 B2* | 11/2021 | Nehlen, III | B01D 37/02 | |
| 11,173,430 B2* | 11/2021 | Gaudfrin | B01D 29/395 | |
| 11,229,865 B2* | 1/2022 | Decker | B01D 46/2407 | |
| 11,364,457 B2* | 6/2022 | Baniassadi | B01D 29/13 | |
| 11,471,798 B2* | 10/2022 | Vallejo | C02F 1/006 | |
| 11,559,757 B2* | 1/2023 | Ruzicka | B01D 35/30 | |
| 11,673,079 B2* | 6/2023 | Nehlen, III | B01D 29/17 | 210/323.2 |
| 11,679,347 B2* | 6/2023 | McFarlen | B01D 29/52 | 210/455 |
| 11,717,775 B2* | 8/2023 | Maiworm | B01D 29/52 | 210/323.1 |
| 11,746,312 B1* | 9/2023 | Whittington | B04B 5/10 | 210/512.1 |
| 11,872,507 B2* | 1/2024 | Jellinggaard | B01D 29/682 | |
| 11,976,770 B2* | 5/2024 | Alghufaili | B01D 29/117 | |
| 12,083,453 B2* | 9/2024 | Powell | B08B 7/02 | |
| 2002/0000405 A1* | 1/2002 | Diemer | B01D 29/19 | 210/323.2 |
| 2003/0164342 A1* | 9/2003 | Mason | B01D 29/114 | 210/323.2 |
| 2004/0094038 A1* | 5/2004 | Hahn | B01D 29/48 | 99/277 |
| 2004/0262209 A1* | 12/2004 | Umezawa | B01D 29/66 | 210/216 |
| 2006/0266685 A1* | 11/2006 | Umezawa | B01D 37/02 | 210/216 |
| 2006/0266686 A1* | 11/2006 | Umezawa | B01D 37/02 | 210/216 |
| 2006/0266687 A1* | 11/2006 | Umezawa | B01D 63/089 | 210/791 |
| 2007/0031304 A1* | 2/2007 | Heidenreich | B01D 46/2407 | 422/177 |
| 2007/0045173 A1* | 3/2007 | Zimmerman | B01D 29/15 | 210/450 |
| 2008/0237152 A1* | 10/2008 | Benachenhou | B01D 17/10 | 210/442 |
| 2009/0050581 A1* | 2/2009 | Kaske | B01D 21/34 | 210/313 |
| 2009/0101601 A1* | 4/2009 | Kaske | B01D 29/114 | 210/411 |
| 2009/0283481 A1* | 11/2009 | Vandendijk | B01D 29/15 | 210/232 |
| 2010/0191023 A1* | 7/2010 | Chen | B01D 9/0054 | 422/187 |
| 2011/0006015 A1* | 1/2011 | Leonard | B01D 29/15 | 210/489 |
| 2011/0031192 A1* | 2/2011 | Wiley | B01D 29/52 | 210/411 |
| 2011/0067370 A1* | 3/2011 | Schumann | B01D 46/08 | 55/492 |
| 2012/0324842 A1* | 12/2012 | Schumann | B01D 46/08 | 55/303 |
| 2013/0319928 A1* | 12/2013 | Zuber | B01D 29/66 | 210/440 |
| 2014/0054160 A1* | 2/2014 | Phelps | B01D 3/143 | 210/678 |
| 2015/0225323 A1* | 8/2015 | Bussell | B01J 19/24 | 422/187 |
| 2016/0002130 A1* | 1/2016 | Bussell | B01D 63/16 | 422/187 |
| 2017/0015612 A1* | 1/2017 | Bussell | C10L 3/107 | |
| 2017/0050908 A1* | 2/2017 | Phelps | B01D 15/36 | |
| 2017/0072344 A1* | 3/2017 | Powell | B01D 29/66 | |
| 2017/0129835 A1* | 5/2017 | Arumugam | C09K 8/035 | |
| 2018/0071967 A1* | 3/2018 | Schröder | B29C 48/503 | |
| 2019/0291028 A1* | 9/2019 | Nehlen, III | B01D 37/02 | |
| 2020/0384387 A1* | 12/2020 | Nehlen, III | B01D 29/52 | |
| 2020/0384388 A1* | 12/2020 | Stuiver | B01D 29/52 | |
| 2021/0039023 A1* | 2/2021 | Nehlen, III | B01D 29/17 | |
| 2021/0052996 A1* | 2/2021 | Nehlen, III | B01D 29/15 | |
| 2021/0061740 A1* | 3/2021 | Ghorbani | B01D 1/14 | |
| 2021/0086111 A1* | 3/2021 | Nehlen, III | B01D 29/62 | |
| 2021/0221951 A1* | 7/2021 | Termorshuizen | C08G 65/30 | |
| 2021/0229006 A1* | 7/2021 | Nehlen, III | B01D 37/02 | |
| 2021/0245078 A1* | 8/2021 | Maiworm | B01D 29/05 | |
| 2021/0268409 A1* | 9/2021 | Ruzicka | B01D 35/30 | |
| 2021/0331098 A1* | 10/2021 | Nehlen, III | B01D 24/047 | |
| 2021/0346824 A1* | 11/2021 | Curley | B01D 24/16 | |
| 2021/0362083 A1* | 11/2021 | Decker | B01D 46/2407 | |
| 2021/0379521 A1* | 12/2021 | Heidenreich | B01D 46/2407 | |
| 2022/0001310 A1* | 1/2022 | Jellinggaard | B01D 29/682 | |
| 2022/0062802 A1* | 3/2022 | Nehlen, III | B01D 29/90 | |

(56) References Cited

U.S. PATENT DOCUMENTS

| | | | |
|---|---|---|---|
| 2022/0099233 A1* | 3/2022 | Alghufaili | B01D 29/117 |
| 2022/0143534 A1* | 5/2022 | Vallejo | B01D 29/902 |
| 2022/0212121 A1* | 7/2022 | Liu | B01D 29/66 |
| 2022/0233978 A1* | 7/2022 | Stuiver | B01D 29/52 |
| 2023/0001335 A1* | 1/2023 | Powell | B01D 29/66 |
| 2023/0052718 A1* | 2/2023 | Hawksley | B01D 29/15 |
| 2023/0149836 A1* | 5/2023 | Hawksley | B01D 24/4884 210/741 |
| 2023/0226470 A1* | 7/2023 | Strasser | B01D 29/52 210/798 |
| 2023/0226479 A1* | 7/2023 | Strasser | B01D 46/62 55/350.1 |
| 2023/0271113 A1* | 8/2023 | Kamath | B01D 24/38 210/268 |
| 2024/0131456 A1* | 4/2024 | Nehlen, III | B01D 29/52 |
| 2024/0226782 A9* | 7/2024 | Nehlen, III | B01D 29/15 |
| 2024/0318514 A1* | 9/2024 | John | E21B 21/065 |

* cited by examiner

SYSTEMS AND METHODS FOR OPERATING CANDLE FILTERS TO RECOVER GLYCOLS FROM DRILLING OPERATIONS

BACKGROUND

Field

The present disclosure relates to systems and methods for recovering materials from drilling operations and, in particular, systems and methods for operating a candle filter system for recovering glycols from drilling operations.

Technical Background

Glycols, such as but not limited to, monoethylene glycol (MEG), are used in oil pipelines and natural gas drilling operations as a hydrate inhibitor that decreases the temperature at which hydrates form. Formation of hydrates can cause blockage of piping and other equipment. To reduce formation of hydrates, MEG is injected into the pipeline or the wellbore to reduce or prevent the formation of hydrates. Afterwards, the MEG is recovered through an MEG recovery system. Recovery of MEG from hydrocarbon drilling or pipeline applications involves recovering a rich MEG stream that can include produced water, MEG, and suspended solids. The rich MEG stream is further processed to remove solids and concentrate the MEG for reuse in the drilling operations or pipeline application.

SUMMARY

Removal of suspended solids from the rich MEG stream during MEG recovery often includes passing at least a portion of or all of the rich MEG stream through a candle filter system, which removes suspended solids from the rich MEG stream to produce a filtrate and a solids slurry. The filtrate comprising the MEG is then further concentrated through an MEG distillation system, and the solids slurry is passed to a slurry drum. Candle filter systems are designed to handle concentrations of Total Dissolved Solids (TDS) of up to about 20,000 milligrams per liter (mg/L) and can be susceptible to reduced operation efficiency when filtering rich MEG streams with high TDS. In particular, when processing rich MEG streams with high TDS, such as having a concentration of TDS of greater or equal to 100,000 mg/L, the candle filter units in the candle filter system can experience rapid blockage of the candle filters with solids, frequent failure to start due to initial high pressure differential across the candle filter units, inefficient cleaning of the candle filters during discharge, and interruptions caused by frequent switching between candle filter units.

Accordingly, there is an ongoing need for methods for operating the candle filter systems to improve the efficiency of operation of the candle filter systems for processing MEG rich streams having high TDS, such as a TDS of greater than or equal to 100,000 mg/l compare to the typical design level of TDS of 20,000 mg/liter. The methods of the present disclosure include determining that a concentration of solids in the rich MEG stream is high, such as greater than or equal to 100,000 mg/L, and switching operation of the candle filter system from a normal low TDS operating mode to a new high TDS operating mode, in which all of the candle filter units are in filtration mode and none of the candle filter units are in standby. Further, the methods of the present disclosure include new methods for the cleaning cycle, such as the addition of a step of draining the residual volume of the MEG rich stream all the way back to the slurry vessel, enhancements to the pulsation step, the inclusion of an override for the high pressure differential shutdown, the addition of a second pulsation-sedimentation-solids removal sequence during the cleaning cycle, and enhanced sedimentation, among other features. The methods of the present disclosure for operating the candle filter system may enable the candle filter system to adjust to high TDS operating conditions with greater run time and reduced downtime.

According to at least one aspect of the present disclosure, a method for operating a candle filter system for removing solids from monoethylene glycol (MEG) recovered from drilling fluids may comprise passing an MEG rich stream to a candle filter system comprising a plurality of candle filter units operated in parallel and a slurry vessel disposed downstream of the candle filter system. The MEG rich stream may comprise at least the MEG and dissolved solids and each of the plurality of candle filter units comprises a vessel, a register, and a plurality of filter candles fluidly coupled to the register. The method may further comprise determining a concentration of total dissolved solids in the MEG rich stream, determining whether to operate the candle filter system in a low TDS mode or a high TDS mode based on the concentration of total dissolved solids (TDS) in the MEG rich stream, filtering the MEG rich stream in the plurality of candle filter units to produce a filtrate and a filter cake deposited on outer surfaces of the filter candles of the candle filter units, determining to conduct a cleaning cycle for one or more of the plurality of candle filter units based on a pressure differential across the plurality of candle filter units, and conducting a cleaning cycle to remove the filter cake from the outer surfaces of the filter candles. Conducting the cleaning cycle my comprise reducing a pressure in the one or more candle filter units; draining a residual volume of the MEG rich stream all the way to the slurry vessel disposed downstream of the candle filter system; after the draining, pulsing the plurality of filter candles with a compressed gas, where the pulsing causes separation of the solid filter cake from the outer surfaces of the filter candles; allowing solids from the solid filter cake to settle in a bottom of the vessel for a sedimentation duration; and removing the solids from the vessel. The method may further include resuming filtering operation of the one or more candle filter units.

Additional features and advantages of the aspects of the present disclosure will be set forth in the detailed description that follows and, in part, will be readily apparent to a person of ordinary skill in the art from the detailed description or recognized by practicing the aspects of the present disclosure.

BRIEF DESCRIPTION OF THE DRAWINGS

The following detailed description of the present disclosure may be better understood when read in conjunction with the following drawings in which.

Figure 1:
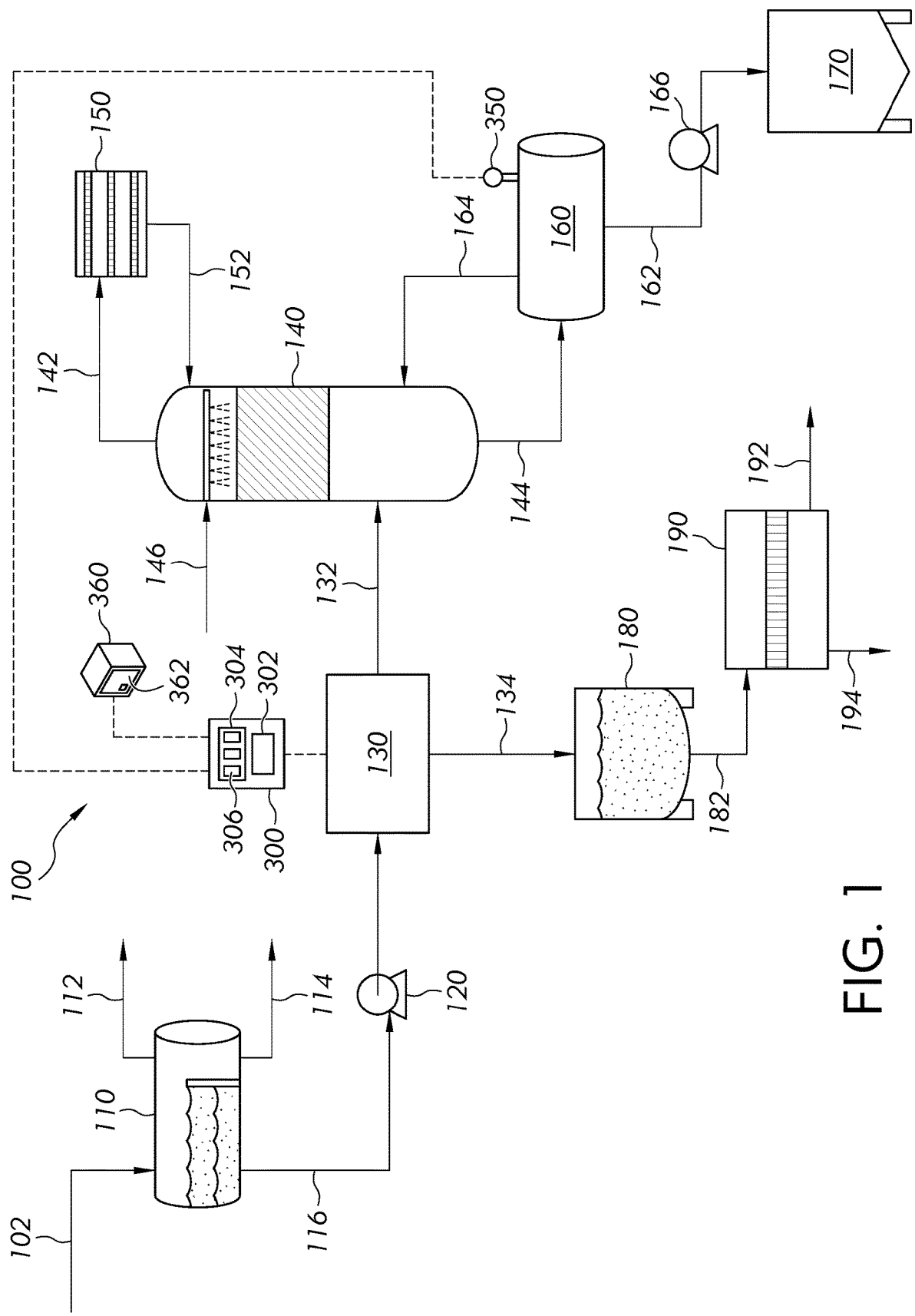
FIG. 1 schematically depicts a generalized flow diagram for an MEG recovery system, according to one or more aspects shown and described in the present disclosure.
Figure 2:
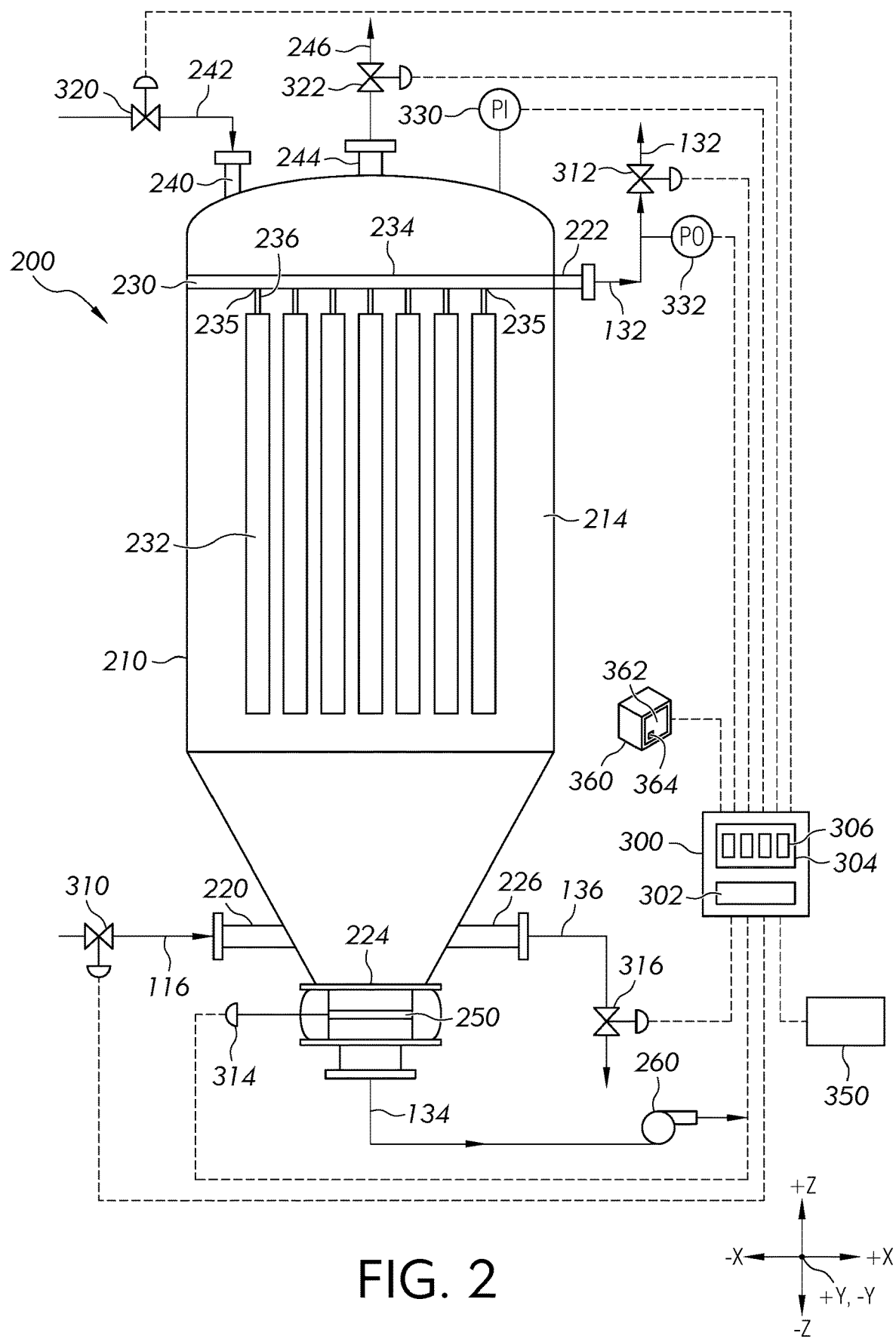
FIG. 2 schematically depicts a cross-sectional side view of a candle filter of the MEG recovery system of FIG. 1, according to one or more aspects shown and described in the present disclosure.
Figure 3:
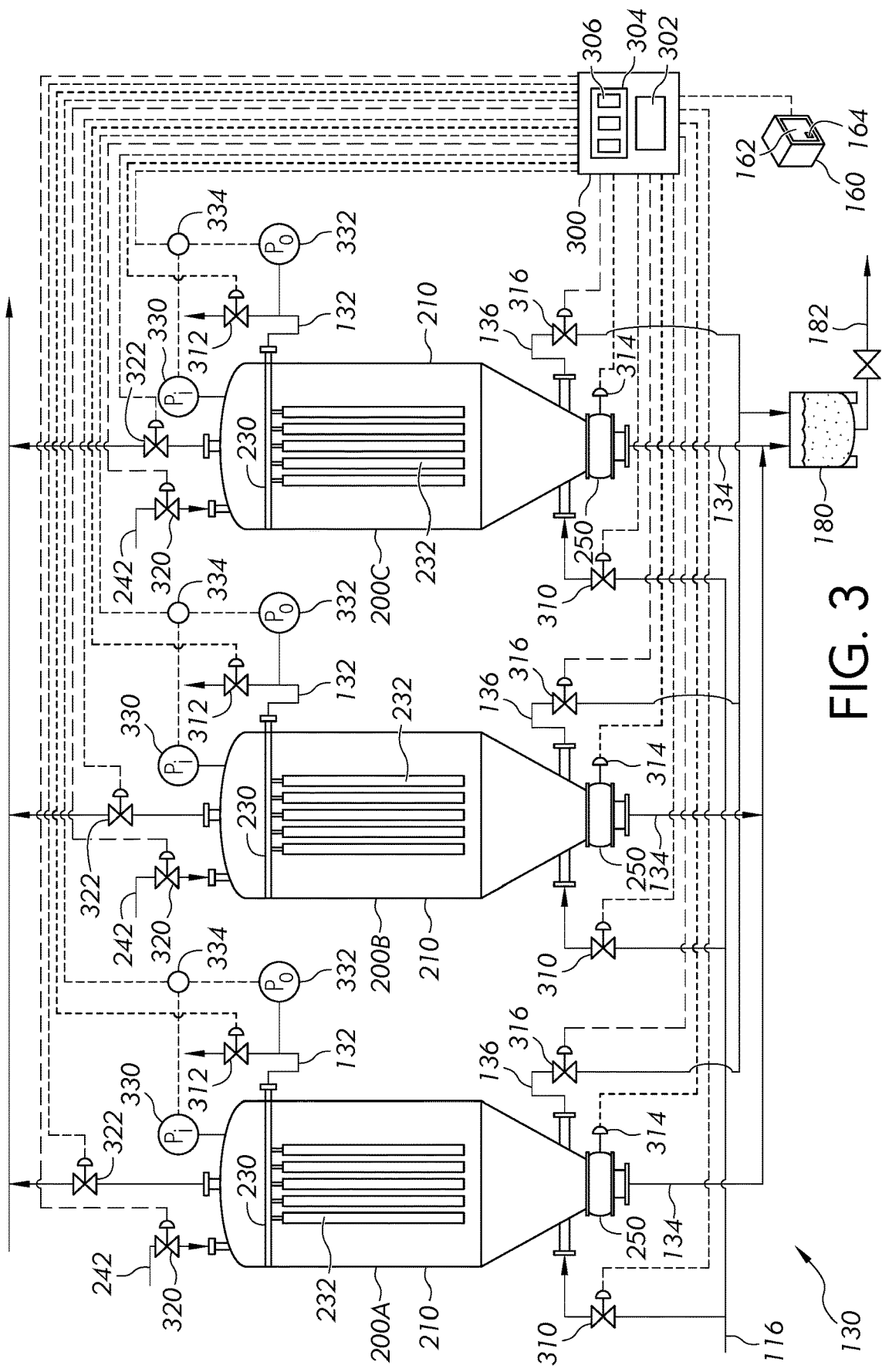
FIG. 3 schematically depicts a generalized flow diagram of a candle filter system of the MEG recovery system of FIG. 1, according to one or more aspects shown and described in the present disclosure.

When describing the simplified schematic illustrations of FIGS. 1-3, many of the numerous valves, temperature sensors, pressure sensors, electronic controllers, and the like, which may be used and are well known to a person of ordinary skill in the art, may not be depicted. Further, accompanying components that are often included in systems such as those depicted in FIGS. 1-3, such as air supplies, heat exchangers, surge tanks, and the like may also not be depicted. However, a person of ordinary skill in the art understands that these components are within the scope of the present disclosure.

Additionally, the arrows in the simplified schematic illustrations of FIGS. 1-3 refer to process streams. However, the arrows may equivalently refer to transfer lines, which may transfer process steams between two or more system components. Arrows that connect to one or more system components signify inlets or outlets in the given system components and arrows that connect to only one system component signify a system outlet stream that exits the depicted system or a system inlet stream that enters the depicted system. The arrow direction generally corresponds with the major direction of movement of the process stream or the process stream contained within the physical transfer line signified by the arrow.

The arrows in the simplified schematic illustrations of FIGS. 1-3 may also refer to process steps of transporting a process stream from one system component to another system component. For example, an arrow from a first system component pointing to a second system component may signify "passing" a process stream from the first system component to the second system component, which may comprise the process stream "exiting" or being "removed" from the first system component and "introducing" the process stream to the second system component.

Moreover, two or more lines intersecting in the simplified schematic illustrations of FIGS. 1-3 may refer to two or more process streams being "mixed" or "combined". Mixing or combining two or more process streams may comprise mixing or combining by directly introducing both streams into a like reactor, separation device, or other system component. For example, two lines intersecting prior to entering a system component may signify the introduction of the two process streams into the system component, in which mixing or combining occurs.

Reference will now be made in greater detail to various aspects of the present disclosure, some of which are illustrated in the accompanying drawings.

DETAILED DESCRIPTION

The present disclosure is directed to methods for operating candle filter systems for removing solids, such as total dissolved solids, from an MEG rich stream recovered from drilling or pipeline operations. In particular, the present disclosure is directed to methods for operating candle filter systems for removing solids from an MEG rich stream, where the methods enable adaptation of the candle filter systems to accommodate MEG rich streams with high concentrations of Total Dissolved Solids (TDS), such as concentrations of TDS greater than or equal to 100,000 mg/L. Referring now to FIGS. 1 and 3, the methods of the present disclosure for operating a candle filter system 130 for removing solids from an MEG rich stream 116 may include passing the MEG rich stream 116 to the candle filter system 130, which may comprise a plurality of candle filter units 200 operated in parallel and a slurry vessel 180 disposed downstream of the candle filter system 130. The MEG rich stream 116 comprises at least the MEG and dissolved solids. Each of the plurality of candle filter units 200 comprises a vessel 210, a register 230, and a plurality of filter candles 232 fluidly coupled to the register 230. The methods of the present disclosure may further include determining a concentration of total dissolved solids in the MEG rich stream 116, determining whether to operate the candle filter system 130 in a low TDS mode or a high TDS mode based on the concentration of total dissolved solids (TDS) in the MEG rich stream 116, filtering the MEG rich stream 116 in the plurality of candle filter units 200 to produce a filtrate 132 and a filter cake deposited on outer surfaces of the filter candles 232 of the candle filter units 200, determining to conduct a cleaning cycle for one or more of the plurality of candle filter units 200 based on a pressure differential across the plurality of candle filter units 200, and conducting a cleaning cycle to remove the filter cake from the outer surfaces of the filter candles 232. Conducting the cleaning cycle may comprise reducing a pressure in the one or more candle filter units 200; draining a residual volume 136 of the MEG rich stream 116 all the way to the slurry vessel 180 disposed downstream of the candle filter system 130; after the draining, pulsing the plurality of filter candles 232 with a compressed gas 242, where the pulsing causes separation of the solid filter cake from the outer surfaces of the filter candles 232; allowing solids from the solid filter cake to settle in a bottom of the vessel 210 for a sedimentation duration; and removing the solids from the vessel 210. The methods may further include resuming filtering operation of the one or more candle filter units 200 after the cleaning cycle.

As used in the present disclosure, a "separation unit" refers to any separation device that at least partially separates one or more chemicals in a mixture from one another. For example, a separation unit may selectively separate different chemical species from one another, forming one or more chemical fractions. Examples of separation units include, without limitation, distillation columns, fractionators, flash drums, knock-out drums, knock-out pots, centrifuges, filtration devices, traps, scrubbers, expansion devices, membranes, solvent extraction devices, high-pressure separators, low-pressure separators, and the like. It should be understood that separation processes described in this disclosure may not completely separate all of one chemical constituent from all of another chemical constituent. It should be understood that the separation processes described in this disclosure "at least partially" separate different chemical components from one another, and that even if not explicitly stated, it should be understood that separation may include only partial separation. As used in this disclosure, one or more chemical constituents may be "separated" from a process stream to form a new process stream. Generally, a process stream may enter a separation unit and be divided or separated into two or more process streams of desired composition.

As used in this disclosure, the term "fractionation" may refer to a process of separating one or more constituents of a composition in which the constituents are divided from each other during a phase change based on differences in properties of each of the constituents. As an example, as used in this disclosure, "distillation" refers to separation of constituents of a liquid composition based on differences in the boiling point temperatures of constituents of a composition.

As used in this disclosure, the terms "upstream" and "downstream" may refer to the relative positioning of unit operations with respect to the direction of flow of the process streams. A first unit operation of a system may be considered "upstream" of a second unit operation if process streams flowing through the system encounter the first unit operation before encountering the second unit operation. Likewise, a second unit operation may be considered "downstream" of the first unit operation if the process streams flowing through the system encounter the first unit operation before encountering the second unit operation.

As used in the present disclosure, passing a stream or effluent from one unit "directly" to another unit may refer to passing the stream or effluent from the first unit to the second unit without passing the stream or effluent through an intervening reaction system or separation system that substantially changes the composition of the stream or effluent. Heat transfer devices, such as heat exchangers, preheaters, coolers, condensers, or other heat transfer equipment, and pressure devices, such as pumps, pressure regulators, compressors, or other pressure devices, are not considered to be intervening systems that change the composition of a stream or effluent. Combining two streams or effluents together also is not considered to comprise an intervening system that changes the composition of one or both of the streams or effluents being combined.

As used in the present disclosure, the term "effluent" refers to a stream that is passed out of a reactor, a reaction zone, or a separation unit following a particular reaction or separation. Generally, an effluent has a different composition than the stream that entered the separation unit, reactor, or reaction zone. It should be understood that when an effluent is passed to another system unit, only a portion of that system stream may be passed. For example, a slip stream or bleed stream may carry some of the effluent away, meaning that only a portion of the effluent may enter the downstream system unit. The term "reaction effluent" may more particularly be used to refer to a stream that is passed out of a reactor or reaction zone.

As used in the present disclosure, the term "filter candle" refers to each of the individual cylindrical shaped filter elements contained within a candle filter unit.

It should further be understood that streams may be named for the components of the stream, and the component for which the stream is named may be the major component of the stream (such as comprising from 50 wt. %, from 70 wt. %, from 90 wt. %, from 95 wt. %, from 99 wt. %, from 99.5 wt. %, or from 99.9 wt. % of the contents of the stream to 100 wt. % of the contents of the stream). It should also be understood that components of a stream are disclosed as passing from one system component to another when a stream comprising that component is disclosed as passing from that system component to another. For example, a disclosed "rich MEG stream" passing to a first system component or from a first system component to a second system component should be understood to equivalently disclose "disulfide oil" passing to the first system component or passing from a first system component to a second system component.

As previously discussed, glycols, such as MEG, are used in hydrocarbon drilling and pipeline applications to reduce formation of hydrates, which can block conduits and other equipment. To reduce formation of hydrates, MEG is injected into the pipeline or the wellbore to reduce or prevent the formation of hydrates. Afterwards, the MEG is recovered from the hydrocarbon drilling or pipeline applications. However, recovered MEG streams can include produced water and suspended solids, dissolved solids, or both in addition to the recovered MEG. The recovered MEG stream is further processed in an MEG recovery system to remove the suspended and dissolved solids and concentrate the MEG for reuse back in the drilling or pipeline application.

Referring now to FIG. 1, one embodiment of an MEG recovery system 100 for removing solids from a recovered MEG stream and concentrating the MEG to produce a lean MEG stream is schematically depicted. The MEG recovery system 100 can include an MEG pretreatment unit 110, an MEG recycle pump 120, a candle filter system 130, and an MEG distillation column 140 comprising a reflux condenser 150 and an MEG reboiler. The MEG recovery system 100 may further include a lean MEG storage tank 170. In embodiments, the MEG recovery system 100 may further include a slurry vessel 180 and a plate filter system 190. The MEG recovery system 100 may include other unit operations or equipment typically used in the process of recovering MEG from drilling materials and or pipeline materials.

After an initial separation to produce the recovered MEG stream 102, the recovered MEG stream 102 may be introduced to the MEG pretreatment unit 110. The MEG pretreatment unit 110 may be operable to further treat the recovered MEG stream 102 to remove additional volatile organic compounds (VOC) in a VOC stream 112 and non-volatile hydrocarbon liquids in a liquid hydrocarbon stream 114 to produce an MEG rich stream 116. The MEG recycle pump 120 may be disposed downstream of the MEG pretreatment unit 110. An inlet of the MEG recycle pump 120 may be in fluid communication with an outlet of the MEG pretreatment unit 110. The MEG recycle pump 120 may be operable to convey the MEG rich stream 116 from the MEG pretreatment unit 110 to the candle filter system 130.

The candle filter system 130 may be disposed downstream of the MEG pretreatment unit 110 and the MEG recycle pump 120. The candle filter system 130 may be in fluid communication with an outlet of the MEG recycle pump 120 to receive the MEG rich stream 116 from the MEG recycle pump 120. The candle filter system 130 is operable to remove dissolved solids from the MEG rich stream 116 to produce a filtrate 132 and a solids slurry 134. The candle filter system 130 may comprise one or a plurality of candle filter units and a candle filter control system 300. The candle filter system 130 will be described in further detail in the present disclosure.

Referring again to FIG. 1, the MEG recovery system 100 may further comprise an MEG distillation system 140 disposed downstream of the candle filter system 130. The MEG distillation system 140 may be in fluid communication with the candle filter system 130 to receive the filtrate 132 from the candle filter system 130. The MEG distillation system 140 may be operable to concentrate the MEG in the filtrate 132 to produce a lean MEG stream 162. In particular, the MEG distillation system 140 may be operable to separate the filtrate 132 into an aqueous stream 154 and the lean MEG stream 162 through distillation, where the boiling point temperature of the water in the filtrate 132 is less than the boiling point temperature of the MEG in the filtrate 132.

The MEG distillation system 140 may comprise an MEG distillation column 142, a reflux condenser 150, and an MEG reboiler. The MEG distillation column 142 may be downstream of the candle filter system 130. The MEG distillation column 142 may be in fluid communication with one or more outlets of the candle filter system 130 so that the filtrate 132 can be passed from the candle filter system 130 to the MEG distillation column 142. For instance, the main filtrate outlet, one or more vents, or both may be passed to the MEG distillation column 142 for concentration of the MEG in the filtrate 132. The MEG distillation column 142 may be operated at a distillation temperature that separates water from MEG to produce the overhead stream 144 and a distillation bottom stream 146, where the overhead stream 144 may comprise primarily water and the distillation bottom stream 146 may comprise primarily MEG. In embodiments, the MEG distillation column 142 may include a water feed 148 to introduce water to the MEG distillation column 142 above the inlet of the filtrate 132 to the MEG distillation column 142. In embodiments, the water feed 148 may be a sour water.

The overhead stream 144 may comprise primarily water from the filtrate 132 and, optionally, the water feed 148. The overhead stream 144 may comprise at least 80%, at least 90%, at least 95%, at least 98%, or even at least 99% of the water from the filtrate 132. The overhead stream 144 may be passed to the reflux condenser 150, which may be operable to condense constituents of the overhead stream 144 to produce an aqueous stream 154. At least a portion of the aqueous stream 154 may be refluxed back to the MEG distillation column 142. In embodiments, the reflux condenser 150 may be operable to produce a reflux stream 152, which may comprise a greater concentration of MEG compared to the aqueous stream 154. The majority of the aqueous stream 154 may be passed out of the MEG recovery system 100, and may be passed to one or more downstream processes for further treatment of the aqueous stream 154.

Referring again to FIG. 1, the distillation bottom stream 146 may be passed to the MEG reboiler 160. The MEG reboiler 160 may be operable to heat the distillation bottom stream 146 and to produce the lean MEG stream 162 and the MEG return stream 164. The MEG return stream 164 may be passed back to the MEG distillation column 142 to provide heat to the MEG distillation column 142 to maintain the temperature at the separation temperature. The lean MEG stream 162 may be passed to a lean MEG storage tank 170 disposed downstream of the MEG reboiler 160. In embodiments, the MEG recovery system 100 may include a lean MEG pump 166, which may be operable to convey the lean MEG stream 162 from the MEG reboiler 160 to the lean MEG storage tank 170. The lean MEG from the lean MEG stream 162 may be stored in the lean MEG storage tank 170 for reuse in the drilling or pipeline application.

Referring again to FIG. 1, the MEG recovery system 100 may further include a slurry vessel 180 disposed downstream of the candle filter system 130. The slurry vessel 180 may be in fluid communication with one or more outlets of the candle filter system 130 to pass the solid slurry 134 from the candle filter system 130 to the slurry vessel 180. The slurry vessel 180 may provide temporary storage for the solid slurry 134 and feeding of the solid slurry to the plate filter system 190 disposed downstream of the slurry vessel 180. The slurry vessel 180 may be agitated to prevent settling of the solids in the slurry vessel 180.

The MEG recovery system 100 may further include the plate filter system 190 disposed downstream of the slurry vessel 180. The plate filter system 190 may include one or a plurality of plate filters and may be operable to separate the solid slurry to produce a plate filter filtrate 192 and a solid filter cake 194. The plate filter filtrate 192, the solid filter cake 194, or both may be passed out of the MEG recovery system 100 for further treatment.

The candle filter system 130 will now be described in further detail. As previously discussed, the candle filter system 130 comprises one or more candle filter units. Referring now to FIG. 2, one embodiment of a candle filter unit 200 is schematically depicted. Each candle filter unit 200 comprises a vessel 210, a register 230 disposed within the vessel 210, and a plurality of filter candles 232 disposed within the vessel 210 and fluidly coupled to the register 230.

The vessel 210 may be a pressure vessel capable of withstanding the pressures over the entire operating range of the candle filter unit 200. The vessel 210 may comprise a vessel wall 212 that defines an internal volume 214 of the vessel 210. The vessel 210 includes an MEG stream inlet 220, a filtrate outlet 220, a solids outlet 224, and a residual volume outlet 226. The MEG stream inlet 220 may be fluidly coupled to the MEG rich stream 116 to pass the MEG rich stream 116 to the candle filter unit 200. The MEG stream inlet 220 may include an MEG inlet control valve 310 operable to control a flow rate of the MEG rich stream 116 through the MEG stream inlet 220 into the vessel 210.

The filtrate outlet 222 may be disposed in a side of the vessel 210 and may be fluidly coupled to the register 230. In embodiments, the register 230 may comprise a plurality of register pipes 234 traversing the internal volume 214 of the vessel 210, and the vessel 210 may comprise a plurality of filtrate outlets 222, wherein each of the filtrate outlets 222 is fluidly coupled to one of the register pipes 234. The filtrate outlets 222 may be operable to pass the filtrate 132 out of the candle filter unit 200. The filtrate outlets 222 may each include a filtrate control valve 312, which may be operable to control a flow rate of the filtrate 132 out of the vessel 210 through the filtrate outlet 222. Referring to FIGS. 1 and 2, the filtrate outlets 222 may be in fluid communication with the MEG distillation system 140 to pass the filtrate 132 from the candle filter unit 200 of the candle filter system 130 to the MEG distillation system 140.

Referring again to FIG. 2, the solids outlet 224 may be disposed in the bottom of the vessel 210. The solids outlet 224 may be sized to remove a solids slurry comprising pieces of solid filter cake from the vessel 210 after dislodging the solid filter cake from the outer surfaces of the filter candles 232 during the cleaning cycle of the candle filter unit 200. The solids outlet 224 may include a solids outlet valve 250 that may be actuated during a cleaning cycle to remove the solid slurry from the vessel 210 during the cleaning cycle. The solids outlet 224 may be operable to pass the solid slurry out of the vessel 210. In embodiments, the solid filter cake pieces may be removed from the vessel 210 as the solids and not as a slurry. In embodiments, the candle filter system 130 may include a solids blower 260 fluidly coupled to the solids outlet valve 250. The solids blower 260 may be operable to convey solids from the solids outlet 224 to the slurry vessel 180 during the cleaning cycle.

The residual volume outlet 226 may be disposed in a bottom portion of the vessel 210. The residual volume outlet 226 may be operable to remove a residual volume 136 of the MEG rich stream from the internal volume 214 of the vessel 210 at the start of the cleaning cycle. The residual volume 136 of the MEG rich stream may comprise the unfiltered MEG rich stream 116 remaining in the internal volume 214 of the vessel 210 prior to the start of the cleaning cycle. The residual volume outlet 226 may comprise a residual volume control valve 316, which may be operable to control the flow of the residual volume 136 of the MEG rich stream through the residual volume outlet 226 out of the vessel 210.

Referring again to FIG. 2, the vessel 210 may further comprise a compressed gas inlet 240, which may be fluidly coupled to a compressed gas source (not shown) to pass a compressed gas 242 into the internal volume of the vessel 210. The compressed gas may be compressed air or a compressed inert gas, such as but not limited to nitrogen, argon, or other inert gas. The compressed gas inlet 240 may comprise a gas inlet control valve 320, which may be operable to control the flow of the compressed gas 242 into the vessel 210, such as during a cleaning cycle. The vessel 210 may further include a gas outlet 244, which may be operable to pass vent gases out of the vessel 210. The gas outlet 244 may include a vent control valve 322, which may be operable to control the flow of vent gases 246 through the gas outlet 244 and out of the vessel 210. In embodiments, the vent gases 246 may include entrained particulates and may be passed from the candle filter unit 200 to the plate filter system 190 for removal of the entrained solids from the vent gas. 246.

Referring again to FIG. 2, the register 230 may comprise one or a plurality of register pipes 234 extending horizontally across the internal volume 214 of the vessel 210, such as extending in the X-Y plane of the coordinate axis of FIG. 2 across the internal volume 214 of the vessel 210. Each of the register pipes 234 may be fluidly coupled to one of the filtrate outlets 222. The end of each register pipe 234 opposite the filtrate outlet 222 may be a closed end so that filtrate from the filter candles 232 flows through the register pipes 234 towards the filtrate outlets 222. Each of the register pipes 234 may have one or a plurality of inlets 235, where each of the inlets 235 is fluidly coupled to one of the filter candles 232.

The candle filter unit 200 further includes a plurality of the filter candles 232 disposed in the vessel 210 and fluidly coupled to the register 230, such as to one of the register pipes 234. Each of the filter candles 232 may be fluidly coupled to an inlet 235 of one of the register pipes 234 by a conduit 236. Each filter candle 232 may comprises a central pipe, which is fluidly coupled to the register pipe 234 by the conduit 236. The filter candle 232 further comprises a support grid disposed around the central pipe. The support grid may be a perforated cylindrical grid surrounding the central pipe. The support grid may define a filtrate collection chamber between the support grid and the central pipe. The perforations in the support grid may provide for a high flow rate of filtrate through the support grid. The filter candle further includes a filter medium disposed on a radially outer surface of the support grid. The filter medium may be a filter cloth, filter screen, or other structure capable of allowing liquid filtrate to pass through the filter medium while preventing solid particles from passing through.

Referring to FIG. 3, in embodiments, the candle filter system 130 may comprise a plurality of candle filter units 200 arranged in parallel. In embodiments, the candle filter system 130 may have 2, 3, 4, 5, 6, or more than 6 candle filter units 200. In embodiments, the candle filter system 130 may comprise 3 candle filter units 200 operated in parallel.

Referring again to FIG. 2, during operation of the candle filter unit 200 in a filtering mode, the MEG rich stream 116 is passed into the vessel of the candle filter unit 200 through the MEG stream inlet 220. The MEG rich stream 116 is introduced at a pressure sufficient to produce a pressure differential across the filter candles 232. The pressure differential across the candle filter unit 200 refers to the difference between the pressure of fluids on the inlet side of the filter candles 232 and the pressure of fluids on the outlet side of the filter candles 232, such as but not limited to the difference between the pressure of the MEG rich stream 116 and the pressure of the filtrate 132 passed out of the filtrate outlet 222. The pressure differential across the filter candles 232 causes liquids, which comprise the MEG, to pass radially through the filter medium of the filter candle 232 into the filtrate collection chamber of the filter candle 232. The filter medium prevents solids from passing through, instead capturing the solids on the radially outer surface of the filter medium. Then, the filtrate flows downward, such as in the −Z direction of the axis in FIG. 2, of the filtrate collection chamber to an inlet of the central pipe of the filter candle 232. The filtrate then flows back up through the central pipe to the register and out of the candle filter unit 200 through the filtrate outlet 222. The filtrate 132 passed out of the candle filter unit 200 may be free of solids, such as total dissolved solids. In embodiments, the filtrate 132 may include less than or equal to 80,000 parts per million by weight total dissolved solids.

As the candle filter unit 200 operates, a filter cake comprising the filtered solids builds up on the outer surface of the filter medium of the filter candles 232. As the filter cake builds up, the pressure differential across the candle filter unit 200 increases. When the pressure differential across the candle filter increases to a threshold differential pressure, such as a differential pressure of greater than or equal to 480 kilopascals (kPa) (about 70 pounds per square inch (psi)), greater than or equal to 520 kPa (about 75 psi), greater than or equal to 530 kPa (about 77 psi), or even greater than or equal to 550 kPa (about 80 psi), the filtration efficiency of the candle filter system decreases dramatically. At this point, the candle filter unit 200 may be transitioned to a cleaning mode to undergo a cleaning cycle to remove the filter cake from the outer surfaces of the filter medium.

Figure 4:
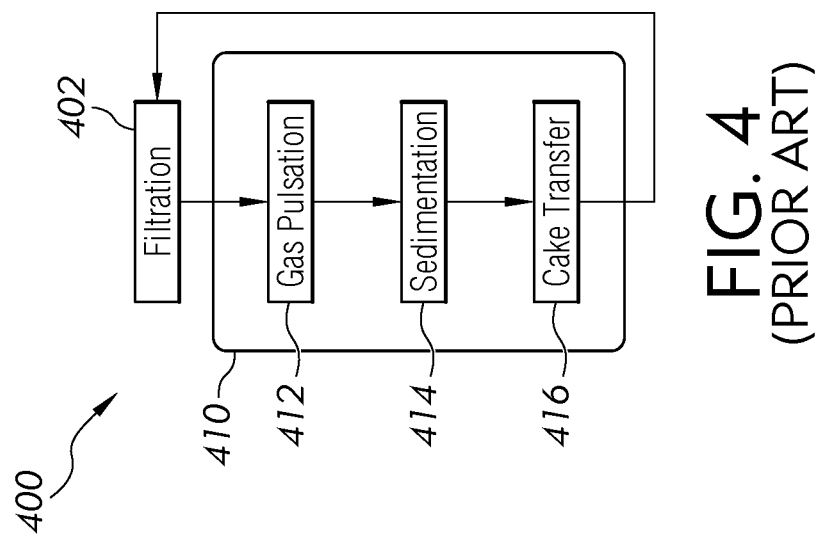
FIG. 4 depicts a flowchart of a method of operating a candle filter unit according to the prior art.

Referring now to FIG. 4, during a conventional cleaning cycle 400 for the candle filter unit, after filtration 402, the candle filter unit is transitioned to a cleaning mode 410. In the cleaning mode 410, the candle filter unit is pulsed with a compressed gas (step 412), which dislodges the solid filter cake from the outer surfaces of the filter candles. The compressed gas pulsation may also break apart the solid filter cake into smaller pieces. In some instances, prior to pulsing with compressed gas, the residual volume of the candle filter is drained at least until the filter candles are exposed and no longer submerged within the liquid. Following compressed gas pulsation 412, the cleaning cycle can include a sedimentation step 414. In the sedimentation step 414, the pieces of the solid filter cake dislodged from the filter candles are allowed to settle in the bottom of the vessel of the candle filter unit. After the sedimentation step 414, the filter cake solids settled at the bottom of the vessel are removed from the vessel in the cake transfer step 416. The solid filter cake may be removed from the vessel either through the solids outlet 224 (FIG. 2) or through the residual volume outlet 226 (FIG. 2). Referring again to FIG. 4, following the cake transfer step 416, the candle filter unit may be transitioned back to filtration mode to resume filtering the suspended solids from the MEG rich stream. Transitioning back to the filtration mode 402 may include filling the vessel back up with the MEG rich stream and increasing the pressure of the MEG rich stream until the filtrate passes through the filter candles into the register and the filtrate outlet.

Referring now to FIG. 3, during normal operation of a candle filter system 130 having a plurality of candle filter units 200A, 200B, 200C, the candle filter system 130 may be operated in swing mode, where at least one of the candle filter units is maintained in a standby mode while the other candle filter units are operated in filtration mode. For instance, during conventional operation, one or more of the candle filter units, such as first candle filter unit 200A and second candle filter 200B may be operated in the filtration mode, while at least one candle filter unit, such as candle filter unit 200C is maintained in the standby mode. In the standby mode, the candle filter unit is isolated so that no flow of the MEG rich stream 116 is introduced to the candle filter unit, and the candle filter unit is idle and is not filtering and is not in a cleaning mode. When the first candle filter unit 200A (or the second candle filter unit 200B) reaches a high differential pressure, which indicates the need for a cleaning cycle, the first candle filter unit 200A may be transitioned to the cleaning mode. Upon transitioning the first candle filter unit 200A to the cleaning mode, the third candle filter unit 200C may be transitioned from the standby mode to the filtration mode to begin filtering the MEG rich stream 116, while the first candle filter unit 200A undergoes the cleaning cycle. Once the cleaning cycle for the first candle filter unit 200A is complete, the first candle filter unit 200A may be transitioned to the standby mode. Then, the second candle filter unit 200B may reach a high differential pressure indicating a need for a cleaning cycle. At this point, the second candle filter unit 200B may be transitioned to the cleaning mode while the first candle filter unit 200A is transitioned from standby mode to filtration mode. Once the cleaning cycle for the second candle filter unit 200B is complete, the second candle filter unit 200B is transitioned to standby. Then, the third candle filter unit 200C reaches a high differential pressure indicating the need for a cleaning cycle. The third candle filter unit 200C is transitioned to the cleaning mode, while the second candle filter unit 200B is transitioned from standby to filtration mode. After the cleaning cycle for the third candle filter unit 200C is complete, the third candle filter unit 200C is transitioned to the standby mode. The process is repeated to maintain continuous operation of the candle filter system 130.

Conventional operation of the candle filter system 130 provides for continuous operation of the candle filter system 130 during normal operating conditions, such as during periods when the total dissolved solids (TDS) of the MEG rich stream 116 is within normal limits. However, when the TDS level of the MEG rich stream 116 is high, such as a concentration of TDS of greater than or equal to 100,000 mg/L, the filter candles in the candle filter units get blocked quickly, such as in less than one hour. Operating in swing mode according to conventional operating procedures, such as with only two of three candle filter units 200 in filtration mode and the third in standby mode, results in the candle filter system 130 becoming quickly overwhelmed with all of the multiple candle filter units 200 transitioned into the cleaning mode. For instance, with each filter candle unit 200 getting blocked in less than an hour, the candle filter system 130 with three candle filter units 200 typically runs for less than 4 hours under a high TDS condition (≥100,000 mg/L TDS) before all the candle filter units 200 are transitioned to cleaning mode. Further, the transient high pressure differential spike, which can result from high TDS concentrations in the MEG rich stream 116, can cause frequent failure of the candle filter units 200 to start in the filtration mode.

Further, the conventional cleaning cycles are not efficient, which can result in excess residual salts remaining on the filter candles 232 after the cleaning cycle. Further, prefilling the vessel 210 of the candle filter units 200 takes a long time, such as greater than 30 minutes, which adds to the cleaning cycle time. Switching between candle filter units 200 during swing mode requires operator intervention and interrupts the flow of MEG through the system. For at least these reasons and more, conventional operating methods for operating candle filter systems 130 for removing solids from the MEG rich stream 116 are not able to handle abnormal operating conditions, such as MEG rich streams 116 with high concentrations of TDS of greater than or equal to 100,000 mg/L TDS.

Thus, there is an ongoing need for operating methods for candle filter system 130 to improve cleaning efficiency and increase the filtration time of the candle filter system 130 during abnormal operating conditions, such as when filtering an MEG rich stream 116 with a high concentration of TDS of greater than or equal to 100,000 mg/L. Referring again to FIG. 3, the methods of operating a candle filter system 130 of the present disclosure may include determining when a high TDS operating condition exists and switching operation of the candle filter system 130 to a high TDS operating mode. In the high TDS operating mode, all of the plurality of candle filter units 200 are operated in the filtration mode in parallel so that the total flow rate of the MEG rich stream 116 is distributed through all of the candle filter units 200 instead of having one of the candle filter units 200 in a standby mode. This reduces the flow rate through each of the individual candle filter units 200 while maintaining the production rate of the candle filter system 130 as a whole. Further, reducing the flow rate in each of the candle filter units 200 may reduce the rate at which the solids build up on the outer surfaces of the filter candles 232, which may increase the total filtration time that each of the individual candle filter units 200 are in the filtration mode during a high TDS operating condition.

The methods disclosed herein further include changes to the cleaning cycle to improve the efficiency of the cleaning cycles, which in turn increases the total filtration time of each of the candle filter units 200 during a high TDS operating condition. In particular, the methods of the present disclosure may include the additional step of draining the residual volume 136 of MEG rich stream all the way to the slurry vessel 180 before pulsing the candle filter unit 200 with the compressed gas. The methods of the present disclosure further include modifications to the compressed gas pulsing to improve breakup and removal of the filter cake solids from the outer surface of the filter candles 232 and increasing the sedimentation duration to improve removal of the solids from the vessel 210. The methods of the present disclosure may further include repeating the cleaning cycle in response to the candle filter system 130 determining that a high pressure differential across the filter candles 232 still exists. To improve the transition from cleaning mode back to filtration mode, the methods of the present disclosure may further include overriding or bypassing a high pressure differential shutdown sequence, which may allow startup of the candle filter units 200 despite transient spike in pressure differential across the candle filter units 200.

Referring now to FIG. 3, the candle filter system 130 may comprise a plurality of candle filter units 200A, 200B, 200C, which are operated in parallel. Each of the candle filter units 200A, 200B, 200C may have any of the components and features previously described in the present disclosure for the candle filter unit 200 of FIG. 2. Each of the candle filter units 200A, 200B, 200C may include a plurality of control valves and a pressure differential system. The candle filter system 130 may further include a slurry vessel 180 disposed downstream of the candle filter system 130. The slurry vessel 180 may be operable to receive the solid slurry 134, or the residual volume 136 of the MEG rich stream in the vessel 210, or both. The candle filter system 130 may further include the control system 300 operable to control operation of the candle filter system 130.

The candle filter system 130 may include a plurality of control valves for each of the candle filter units 200. The control valves can include, but are not limited to the MEG inlet control valve 310, the filtrate control valve 312, solids outlet valve 250, residual volume control valve 316, gas inlet control valve 320, and the vent control valve 322 for each of the candle filter units 200. Each of these control valves can be any type of control valve suitable for the stream in which it is disposed. Each of the control valves may include a valve body placed in a fluid flow, a flow restrictor disposed within the valve body, and an actuator operable to change a position of the flow restrictor to change the flow rate through the control valve. In embodiments, the actuator of the control valve may be operable to transition the flow restrictor between an open position and a closed position. In embodiments, the actuator of the control valve may be operable to change a position of the flow restrictor at one or more positions between fully open and closed to change a flow rate of materials through the control valve. As used in the present disclosure, the term "closed" when used in relation to a valve, refers to the fully closed position that prevents fluid from passing through the valve. It is understood that any reference to changing a position or condition of a control valve refers to operating the actuator to change the position of the flow restrictor of that control valve. The control valves may be communicatively coupled to the control system 300, such as by having the actuator communicatively coupled to the control system 300 through wired or wireless communication channels.

Referring again to FIG. 3, each candle filter unit 200A, 200B, 200C may comprise the MEG inlet control valve 310, which may be disposed at the MEG stream inlet 220. The MEG inlet control valve 310 may be operable to control a flow rate of the MEG rich stream 116 through the MEG stream inlet 220 into the vessel 210. The actuator of the MEG inlet control valve 310 may be operable to change the position of the flow restrictor of the MEG inlet control valve 310 to a fully open position, a closed position, and a plurality of positions between closed and fully open. The MEG inlet control valve 310 may be operable to stop the flow of the MEG rich stream 116 to the vessel 210, such as prior to a cleaning cycle, or may adjust the flow rate of the MEG rich stream 116 to the vessel 210, such as by changing the feed flow rate when switching between a low TDS mode and a high TDS mode of operation.

Each of the filtrate outlets 222 may include a filtrate control valve 312, which may be operable to control a flow rate of the filtrate 132 out of the vessel 210 through each of the filtrate outlets 222. The actuator of the filtrate control valve 312 may be operable to change the position of the flow restrictor of the filtrate control valve 312 to a fully open position, a closed position, and a plurality of positions between closed and fully open. In embodiments, the filtrate control valve 312 may be actuated between a fully open position during filtration and a closed position during a cleaning cycle, which may prevent back flow of the filtrate 132 into the vessel 210 during the cleaning cycle.

Each of the candle filter units 200A, 200B, 200C may include a solids outlet valve 250 disposed at the solids outlet 224. The solids outlet valve 250 may include the solids valve actuator 314 operatively coupled to the solids outlet valve 250. The solids valve actuator 314 may be operable to transition the solids outlet valve 250 between the closed position and a fully open position. The solids outlet valve 250 may be actuated during a cleaning cycle to remove the solid slurry from the vessel 210 after the sedimentation step of the cleaning cycle. The solids outlet 224 may be operable to pass the solid slurry out of the vessel 210. The solids outlet valve 250 is transitioned to the closed position after the solids removal step so that the candle filter unit can be transitioned back to filtering operation. The solids outlet valve 250 may be maintained in the closed position during filtering.

Each of the candle filter units 200A, 200B, 200C may include a residual volume control valve 316 disposed downstream of the residual volume outlet 226. The residual volume control valve 316 may be operable to control the flow of the residual MEG rich stream 136 through the residual volume outlet 226 out of the vessel 210. The actuator of the residual volume control valve 316 may be operable to transition the flow restrictor of the residual volume control valve 316 between a fully open position and a closed position. In embodiments, the residual volume control valve 316 of one or more of the candle filter units may be actuated to the fully open position during the step of draining the residual volume 136 of the MEG from the vessel 210 at the beginning of a cleaning cycle. The residual volume control valve 316 may be actuated to transition to the closed position after draining the residual volume 136 from the vessel 210. The residual volume control valve 316 may be maintained in the closed position during filtering.

Each of the candle filter units 200A, 200B, 200C may include a gas inlet control valve 320 disposed upstream of the compressed gas inlet 240 of the vessel 210. The gas inlet control valve may be operable to control the flow of the compressed gas 242 into the vessel 210, such as during a cleaning cycle. The actuator of the gas inlet control valve 320 may operable to transition the flow restrictor of the gas inlet control valve 320 between a fully open position and a closed position. The gas inlet control valve 320 may be in the closed position during filtering. In embodiments, during the pulsation step of the cleaning cycle, the gas inlet control valve 320 may be cycled back-and-forth between the fully open position and the closed position to produce pulses of the compressed gas into the vessel 210 during the pulsation step of the cleaning cycle.

Each of the candle filter units 200A, 200B, 200C may include the vent control valve 322 disposed downstream of the gas outlet 244 of the vessel 210. The vent control valve 322 may be operable to control the flow of vent gases 246 through the gas outlet 244 and out of the vessel 210. The actuator of the vent control valve 322 may operable to transition the flow restrictor of the vent control valve 322 between a fully open position and a closed position. The vent control valve 322 may be in the closed position during filtering. In embodiments, during the pulsation step of the cleaning cycle, the vent control valve 322 may be transitioned to the fully open position to allow gases to escape the vessel 210 during the pulsation step of the cleaning cycle.

Referring again to FIG. 3, each of the candle filter units 200A, 200B, 200C may include at least an inlet pressure sensor 330 and an outlet pressure sensor 332. In embodiments, each of the candle filter units may include a pressure differential indicator (PDI) 334 communicatively coupled to the inlet pressure sensor 330 or the outlet pressure sensor 332. The inlet pressure sensor 330 may be disposed on the inlet side of the filter candles 232, such as in fluid communication with the vessel 210 on the inlet side of the filter candles 232, in fluid communication with the MEG stream inlet 220, or upstream of the MEG stream inlet 220. The inlet pressure sensor 330 may be operable to measure a relative fluid pressure on the inlet side of the filter candles 232 of the candle filter unit 200A, 200B, 200C, such as the pressure of the MEG rich stream 116 in the vessel 210 of the candle filter unit.

The outlet pressure sensor 332 may be disposed on the outlet side of the filter candles 232. In embodiments, the outlet pressure sensor 332 may be in fluid communication with the register 230, with one or more of the filtrate outlets 222, with the piping downstream of the filtrate outlets 222, or combinations thereof. The outlet pressure sensor 332 may be operable to measure a relative fluid pressure on outlet side of the filter candles 232 of the candle filter unit 200A, 200B, 200C, such as the relative pressure of the filtrate 132 in the register 230 or passing through the filtrate outlets 222. The inlet pressure sensor 330, the outlet pressure sensor 332, or both may be any pressure sensor suitable for measuring the pressure of fluids in the candle filter units.

Referring again to FIG. 3, in embodiments, the inlet pressure sensor 330, the outlet pressure sensor 332, or both may be communicatively coupled to a pressure differential indicator 334 (PDI 334). The PDI 334 may be operable to receive an inlet pressure indication from the inlet pressure sensor 330 and an outlet pressure indication from the outlet pressure sensor 332. The PDI 334 may be operable to compare the inlet pressure indication and the outlet pressure indication and calculate a pressure differential across the candle filter unit from the inlet pressure indication and the outlet pressure indication. In embodiments, the PDI 334 may display the pressure differential on a display, which may be an analog display (differential pressure gauge) or a digital display. In embodiments, the inlet pressure sensor 330 and the outlet pressure sensor 332 may be directly communicatively coupled to the control system 300, where the control system 300 may function as the PDI 334 by comparing the inlet pressure indication and the outlet pressure indication and producing a PDI signal, which may be indicative of the pressure differential across the candle filter units 200A, 200B, 200C. In embodiments, the PDI signal indicative of the pressure differential may be used as a variable to control the candle filter system 130. Alternatively or additionally, in embodiments, the PDI signal may be output to a display device for display of the differential pressure to the operator of the candle filter system 130.

Referring again to FIG. 1, in embodiments, the MEG recovery system 100 may include one or more downstream sensors 350 for measuring one or more system parameters downstream of the candle filter system 130, such as one or more operating parameters of the MEG distillation system 140, the MEG reboiler 160, the lean MEG pump 166, the lean MEG storage tank 170, the slurry vessel 180, the plate filter system 190, or combinations of these. In embodiments, the downstream sensors 350 may include one or more of level sensors in the MEG reboiler 160, both bundle side and lean MEG side; run sensors on the lean MEG pumps 166, which indicate whether the lean MEG pumps are running and lean MEG is flowing; level sensors in the lean MEG storage tank 170; level sensors in the slurry vessel 180; other sensors; or combinations of these. The downstream sensors 350 may be operable to identify downstream operating conditions influencing whether to operate or shut down the candle filter system 130.

Referring again to FIGS. 1-3, the candle filter system 130 may further include a control system 300. The control system 300 may include one or a plurality of processors 302, one or a plurality of memory modules 304 communicatively coupled to the processors 302, and computer readable and executable instructions stored in the memory modules 304. The control system 300 may be communicatively coupled to the MEG inlet control valve 310, the filtrate control valve 312, the solids valve actuator 314, the residual volume discharge control valve 316, the gas inlet control valve 320, the vent control valve 322, the MEG recycle pump 120, or combinations of these. The control system 300 may be configured to control operation or actuation of one or more of the MEG inlet control valve 310, the filtrate control valve 312, the solids valve actuator 314, the residual volume discharge control valve 316, the gas inlet control valve 320, the vent control valve 322, the MEG recycle pump 120, or combinations of these during operation of the candle filter system 130 in the filtering mode, the cleaning cycle, or during transitions between cleaning cycles and the filtering mode.

The control system 300 may be communicatively coupled to one or more measuring devices, such as but not limited to one or more of the inlet pressure sensor 330, the filtrate outlet pressure sensor 332, the differential pressure indicator 334, one or more of the downstream sensors 350, or combinations of these. The control system 300 may be configured to receive signals from one or more of the inlet pressure sensor 330, the filtrate outlet pressure sensor 332, the differential pressure indicator 334, one or more of the downstream sensors 350, or combinations of these measuring devices sensors. The control system 300 may be configured to process the signals from the measuring devices and control operation of the candle filter system 130 based on the processing of the signals from the measuring devices.

The machine readable and executable instructions 306 may be stored on the memory modules 304 and may be executed by the processors 302 to cause the control system 300 to control the candle filter system 130 according to any of the methods described in the present disclosure. In other words, any of the methods disclosed in the present disclosure may be embodied in the machine readable and executable instructions 306.

Referring again to FIGS. 1-3, the control system 300 may further include a display 360 communicatively coupled to the processors 302. The display 360 may include a user interface 362 displayed on the display 360. In embodiments, the display 360 may be a touch screen operable to display the user interface 362 and also accept operator input through contact with the display. In embodiments, the control system 300 may include one or more user input devices (not shown) separate from the display and operable to enable the operator to make control selections through the user interface 362. Separate user input devices may include but are not limited to one or more of a keyboard, mouse, microphone, push button, toggle switches, or other type of user input device.

Referring now to FIG. 3, the methods of the present disclosure for operating the candle filter 130 for removing solids from MEG recovered from drilling fluids will now be described. The methods of the present disclosure for operating the candle filter system 130 may include passing the MEG rich stream 116 to the candle filter system 130. The candle filter system 130 may include a plurality of the candle filter units 200A, 200B, 200C, which may be operated in parallel, and the slurry vessel 180 disposed downstream of the candle filter units. The candle filter system 130 may have any of the components or features previously discussed herein for the candle filter system 130. The MEG rich stream 116 may comprise at least the MEG and dissolved solids. Each of the plurality of candle filter units 200A, 200B, 200C may comprise the vessel 210, the register 230, and the plurality of filter candles 232 fluidly coupled to the register 230. The candle filter units 200A, 200B, 200C may have any of the components or features previously described in the present disclosure in relation to the candle filter unit 200. The methods of the present disclosure may further include determining the concentration of total dissolved solids in the MEG rich stream 116, determining whether to operate the candle filter system 130 in a low TDS mode or a high TDS mode based on the concentration of total dissolved solids (TDS) in the MEG rich stream 116, and filtering the MEG rich stream 116 in one or more of the candle filter units 200A, 200B, 200C to produce the filtrate 132 and a filter cake deposited on outer surfaces of the filter candles 232. The methods may further include determining to conduct a cleaning cycle for one or more of the candle filter units 200A, 200B, 200C based on the pressure differential across the candle filter units and conducting a cleaning cycle to remove the filter cake from the outer surfaces of the filter candles 232.

Conducting the cleaning cycle for one or more of the candle filter units 200A, 200B, 200C may include reducing the pressure in the candle filter unit; draining the residual volume 136 of the MEG rich stream all the way to the slurry vessel 180 disposed downstream of the candle filter system 130; after draining to the slurry vessel 180, pulsing the filter candles 232 with the compressed gas 242, wherein the pulsing causes separation of the solid filter cake from the outer surfaces of the filter candles 232; allowing solids from the solid filter cake to settle in a bottom of the vessel 210 for a sedimentation duration; and removing the solids 134 from the vessel 210. Following the cleaning cycle, the methods may include resuming filtering operation of the one or more candle filter units 200A, 200B, 200C.

Figure 5:
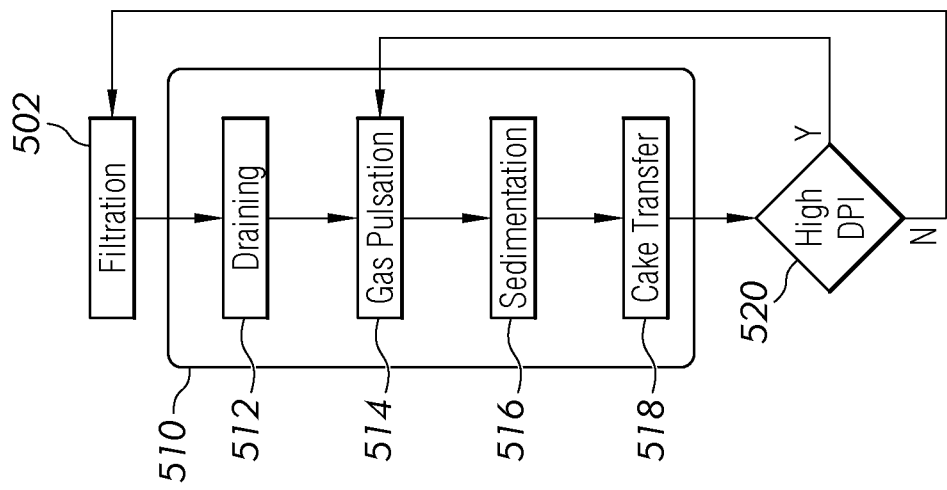
FIG. 5 depicts a flowchart of a method of operating a candle filter unit of the candle filter system of FIG. 3, according to one or more aspects shown and described in the present disclosure.

Referring to FIG. 5, a flow chart of the methods 510 for cleaning the candle filter units is graphically depicted. As shown in FIG. 5, after filtration 502, the methods 510 for cleaning the solids from the candle filter units may include the draining step 512, during which the pressure in the candle filter unit is reduced and the residual volume of material is drained back to the slurry vessel. Following draining, the method 510 may include gas pulsation 514, during which the compressed gas is pulsed repeated into the vessel of the candle filter unit to dislodge the solid filter cake from the outer surface of the filter candles. The gas pulsation 514 may be followed by a sedimentation step 516, during which the solids from the dislodged filter cake are allowed to settle in the bottom of the vessel. Once the solid filter cake is settled in the bottom at the conclusion of the sedimentation step 516, the methods 510 include a cake transfer step 518, during which the solids from the dislodged filter cake are transferred to the slurry vessel. Following removal of the solids during cake transfer 518, the differential pressure across the candle filter unit may be measured. If the differential pressure is too high, then one or more subsequent cleaning cycles can be performed, where each subsequent cleaning cycle may comprise the steps of gas pulsation 514, sedimentation 516, and cake transfer 518. If the differential pressure across the candle filter unit is low, then the candle filter unit can be transitioned back to filtration mode for filtration 502 of the MEG rich stream.

Referring again to FIG. 3, determining the concentration of total dissolved solids (TDS) in the MEG rich stream 116 may include measuring the concentration of the TDS in the MEG rich stream 116 upstream of the candle filter system 130, at the MEG stream inlet 220, or in the vessels 210 of the candle filter units 200A, 200B, 200C. The concentration of TDS of the MEG rich stream 116 may be measured using one or more instruments suitable for the purpose. The TDS instrument may be operable to produce a TDS signal indicative of the concentration of the TDS of the MEG rich stream 116 and transmit the TDS signal to the control system 130. In embodiments, determining the concentration of TDS in the MEG rich stream 116 may comprise measuring the pressure differential across one or more of the candle filter units 200A, 200B, 200C and determining a relative concentration of TDS in the MEG rich stream 116 based on the measurement of the pressure differential. In embodiments, the concentration of TDS may be determined from measuring the change in pressure differential with time for one or more of the candle filter units. Other methods of determining the concentration of TDS or relative concentration of TDS in the MEG rich stream 116 may be employed.

As previously discussed, based on the concentration of TDS (or relative concentration of TDS) in the MEG rich stream 116, the candle filter system 130 may be operated in a low TDS mode or a high TDS mode. Determining whether to operate the candle filter system 130 in the low TDS mode or the high TDS mode may comprise determining when the concentration of TDS in the MEG rich stream 116 is less than a threshold concentration and operating the candle filter system 130 in the low TDS mode, and determining when the concentration of TDS in the MEG rich stream 116 is greater than or equal to the threshold concentration and operating the candle filter system 130 in the high TDS mode. In embodiments, the threshold concentration of TDS in the MEG rich stream 116 may be 100,000 parts per million by weight (ppmw, wherein 1 ppmw≈1 mg/L). In embodiments, when the concentration of TDS in the MEG rich stream 116 is less than 100,000 ppmw, the candle filter system 130 may be operated in the low TDS mode, and when the concentration of TDS in the MEG rich stream is greater than or equal to 100,000 ppmw, the candle filter system 130 may be operated in the high TDS mode.

In embodiments, operating the candle filter system 130 in the low TDS mode may comprise operating the candle filter system 130 in a swing mode in which at least a first candle filter unit is operating in a filtering mode, and a second candle filter unit is in a standby mode. The standby mode refers to a mode of operation where the candle filter unit is idle and is not actively filtering the MEG rich stream and is not undergoing a cleaning cycle. When the at least one first candle filter in filtering mode reaches a high pressure differential condition, the at least one first candle filter unit may be transitioned to cleaning mode while the second candle filter unit is transitioned to filtering mode. A cleaning cycle may be conducted on the first candle filter unit. Following conducting the cleaning cycle on the first candle filter unit, the first candle filter unit may be transitioned to the standby mode until the second candle filter unit reaches a high pressure differential condition. Then, the second candle filter unit may be transitioned to the cleaning mode, and the first candle filter unit may be transitioned to filtering mode, and so forth.

Referring again to FIG. 3, in the low TDS mode, the candle filter system 130 may run with candle filter unit 200A and candle filter unit 200B in filtering mode, with candle filter unit 200C in standby (not filtering or cleaning). When candle filter unit 200A reaches a high differential pressure indicating that a cleaning cycle is needed, the candle filter unit 200A may be transitioned to cleaning mode, and candle filter unit 200C may be transitioned to filtering mode. A cleaning cycle is conducted for candle filter unit 200A. When the cleaning cycle is completed, candle filter unit 100A may be transitioned to standby mode, with candle filter unit 200B and candle filter unit 200C in filtering mode. When either of candle filter units 200B or 200C reach the high differential pressure condition, it would be transitioned to the cleaning mode while candle filter unit 200A is transitioned to the filtering mode. The switching between standby mode, cleaning mode, and filtering mode may continue in this manner during operating the candle filter system 130 in the low TDS mode of operation. In the low TDS mode, the candle filter units operating in filtration mode are operated at 100% of the flow rate capacity of the candle filter unit, and the candle filter unit in standby is idle and filtering at 0% of the flow rate capacity.

Referring again to FIG. 3, when the concentration of TDS in the MEG rich stream 116 is greater than or equal to the threshold concentration of TDS in the MEG rich stream 116, such as greater than or equal to 100,000 ppmw, the candle filter system 130 may be transitioned to and operated in the high TDS mode. In the high TDS mode, each of the plurality of candle filter units 200A, 200B, 200C may be operated in the filtration mode, and none of the candle filter units 200A, 200B, 200C is in standby mode. In the high TDS mode, since all of the candle filter units 200A, 200B, and 200C are in filtration mode at the same time, each of the candle filter units 200A, 200B, 200C may be operated at designed flow rate that is 100% of the full flow rate capacity of each candle filter unit while others are on standby mode or regen cycle. In embodiments, each of the candle filter units 200A, 200B, 200C may be operated simultaneously at 100% of the full flow rate capacity during operation of the candle filter system 130 in the high TDS mode.

Operating each of the candle filter units 200A, 200B, 200C in the filtration mode at less than full flow rate capacity may reduce the rate at which the solid filter cake builds up on the outer surface of the filter candles 232 in any one candle filter unit 200A, 200B, 200C, thereby reducing the rate at which the pressure differential increases. In high TDS mode, decreasing the rate at which the solid filter cake builds up on the filter candles 232 in the candle filter units 200A, 200B, 200C may increase the run time of the candle filter system 130 before any of the candle filter units 200A, 200B, 200C reach a differential pressure indicating the need for a cleaning cycle. Thus, in high TDS mode, the candle filter system 130 may be better able to maintain production rate of the filtrate 132 passed downstream to the MEG distillation system 140 (FIG. 1). In high TDS mode, once one or more of the candle filter units 200A, 200B, 200C reaches a high differential pressure indicative of a need to undergo a cleaning cycle, the candle filter unit 200A. 200B, 200C may be transitioned from the filtering mode to the cleaning mode, and a cleaning cycle may be conducted to remove the solid filter cake from the outer surfaces of the filter candles 232.

Referring again to FIG. 3, as previously discussed, the methods of operating the candle filter system 130 of the present disclosure may include determining to conduct a cleaning cycle for one or more of the plurality of candle filter units 200A, 200B, 200C. Determining to conduct a cleaning cycle for one or more of the plurality of candle filter units may include measuring the pressure differential across each one of the plurality of candle filter units 200A, 200B, 200C and determining to conduct the cleaning cycle when the pressure differential across one or more of candle filter units 200A, 200B, 200C is greater than or equal to a cleaning threshold pressure differential. The cleaning threshold pressure differential may be 480 kilopascals (kPa, or about 70 pounds per square inch (psi)), 530 kPa (about 77 psi), or even 550 kPa (about 80 psi). In embodiments, the methods may include determining to conduct the cleaning cycle when the pressure differential across one or more of candle filter units 200A, 200B, 200C is greater than or equal to 480 kPa, greater than or equal to 530 kPa, or even greater than or equal to 550 kPa. As previously discussed, the pressure differential may be determined by measuring the inlet pressure with the inlet pressure sensor 330, measuring the outlet pressure with the outlet pressure sensor 332, and comparing the outlet pressure and the inlet pressure to determine the pressure differential. The pressure differential may be the absolute value of the difference between the inlet pressure and the outlet pressure. Comparing the outlet pressure and inlet pressure to determine the pressure differential may be performed by the pressure differential indicator 334 (as in FIG. 3) or by the control system 300 (as in FIG. 2).

In embodiments, determining to conduct a cleaning cycle may comprise measuring the pressure differential across the entire candle filter system 130, and when the pressure differential across the entire candle filter system 130 is greater than or equal to the cleaning threshold pressure differential, conducting a cleaning cycle for one or all of the candle filter units 200A, 200B, 200C. Referring to FIG. 1, determining the pressure differential across the entire candle filter system 130 may include measuring a pressure of the MEG rich stream 116 immediately upstream of the candle filter system 130, such as between the MEG recycle pump 120 and the candle filter system 130, and measuring a pressure of the filtrate 132 passed from the candle filter system 130 to the MEG distillation system 140, and comparing the pressure of the MEG rich stream 116 to the pressure of the filtrate 132. In embodiments, such as when operating the candle filter system 130 in high TDS mode, all of the candle filter units 200A, 200B, 200C may be transitioned to the cleaning mode and subjected to a cleaning cycle at the same time. In embodiments, one or a subset of the candle filter units 200A, 200B, 200C may be transitioned to the cleaning mode and subjected to the cleaning cycle while the remaining candle filter units are maintained in filtering mode.

As previously discussed, the methods for conducting the cleaning cycle may include draining the residual volume 136 of the MEG rich stream from the vessel 210 of the candle filter unit 200A, 200B, 200C all the way to forward to the slurry vessel 180. Draining the residual volume 136 all the way to the slurry vessel 180 may reduce or prevent reintroduction of solids back into the vessel 210 when transitioning from the candle filter unit 200 from the cleaning cycle back to filtration mode. Draining the residual volume 136 all the way to the slurry vessel 180 may cause separation of the drained MEG from the filtered solids at the slurry vessel 180. The residual volume 136 may be drained from the vessel 210 by closing the MEG inlet control valve 310 and opening the residual volume discharge control valve 316. In embodiments, the pressure may be relieved from the vessel 210 after closing the MEG inlet control valve 310 and opening the residual volume discharge control valve 316. In embodiments, the residual volume 136 may be conveyed to the slurry vessel 180 by means of one or more pumps (not shown).

Referring again to FIG. 5, after draining 512 the residual volume back to the slurry vessel, the cleaning cycle includes the gas pulsation step 514. During the gas pulsation step 514, the filter candles are pulsed with a compressed gas to dislodge the solid filter cake from the outer surfaces of the filter candles. Referring now to FIG. 3, pulsing the plurality of filter candles 232 with the compressed gas 242 may include introducing the compressed gas 242 to the internal volume of the vessel 210 in a plurality of bursts spaced apart over a total gas pulsation duration. In other words, during pulsation, the compressed gas 242 is turned on for a pulse duration and then turned off for an idle period. After a short time, the compressed gas 242 is turned on for a subsequent duration, then then turned off again for a subsequent idle period. The pulsing is continued until the end of the total gas pulsation duration.

The compressed gas 242 may be air, nitrogen, a noble gas such as argon, or other inert gas that does not chemically interact to any significant degree with the MEG or the constituents of the solid filter cake. In embodiments, the compressed gas may be nitrogen gas. In the methods of the present disclosure, the compressed gas 242 may be supplied at a greater pressure compared to conventional operation of the candle filter system 130. In embodiments, the compressed gas 242 may be supplied to the candle filter units 200A, 200B, 200C at a pressure of from 200 kPa to 400 kPa absolute pressure, such as from 250 kPa to 400 kPa, from 275 kPa to 400 kPa, or from 300 kPa to 400 kPa absolute pressure. In embodiments, the compressed gas 242 may be supplied to the candle filter units at a gauge pressure of from 170 kPa to 300 kPa gauge pressure, such as from 200 kPa to 300 kPa gauge pressure. The greater pressure of the compressed gas 242 may improve the ability of the compressed gas 242 to dislodge the solid filter cake from the outer surface of the filter candles 232 during the gas pulsation. If the pressure of the compressed gas is less than about 170 kPa gauge pressure, the pressure of the compressed gas 242 may not be sufficient to dislodge and break apart the solid filter cake that is built up on the outer surface of the filter candles 232, which can result in the outer surface of the filter candles 232 being at least partially blocked by pieces of the solid filter cake remaining on the filter material of the filter candles 232. Thus, insufficient pressure can result in reduced filtering efficiency of the filter candle unit 200A, 200B, 200C after the cleaning cycle.

During each pulse of the compressed gas 242, the gas inlet control valve 320 is opened. The vent control valve 322 may be in the opened or closed positions during the pulse. In embodiments, each of the pulses of the compressed gas 242 may have a pulse duration of from 5 seconds to 30 seconds, such as from 5 seconds to 25 seconds, from 5 seconds to 20 seconds, from 10 seconds to 30 seconds, from 10 seconds to 25 seconds, from 10 seconds to 20 seconds, from 15 seconds to 30 seconds, from 15 seconds to 25 seconds, or from 20 seconds to 30 seconds. The duration of each pulse of the compressed gas may be greater than the duration of the compressed gas pulses during conventional operation of the candle filter system 130. The increased pulse duration of the compressed gas pulses may increase the amount of solid filter cake dislodged and removed from the outer surface of the filter candles during each pulse.

At the conclusion of each pulse, the gas inlet control valve 320 is closed with the vent control valve 322 in the open or closed condition. During the duration of the idle period, the gas inlet control valve 320 may be in the closed position. In embodiments, each of the idle periods may have a duration of from 5 seconds to 60 seconds, such as from 5 seconds to 50 seconds, from 5 seconds to 40 seconds, from 10 seconds to 60 seconds, from 10 seconds to 50 seconds, from 10 seconds from to 40 seconds, from 20 seconds to 60 seconds, from 20 seconds to 50 seconds, from 20 seconds to 40 seconds, or any subranges between these values.

The alternating pulses of the compressed gas 242 separated by idle periods may be continued for a total gas pulsation duration. The total gas pulsation duration may be greater than the total duration of gas pulsation during conventional operation of the candle filter system 130. In embodiments, the total gas pulsation duration may be greater than or equal to 10 minutes, such as from 10 minutes to 20 minutes. The greater total gas pulsation duration may further improve and increase the removal of the solid filter cake from the outer surfaces of the candle filters 232. Improved removal of the solid filter cake from the outer surfaces of the candle filters 232 may provide lower pressure differential and greater filtration efficiency of the candle filter units 200A, 200B, 200C when the candle filter units are returned to filtration mode. When the total gas pulsation duration is less than 10 minutes, the number and duration of compressed gas pulses may not be enough to dislodge all of the solid filter cake from the outer surfaces of the candle filters 232, which can result in increased pressure differential and reduced filtration efficiency once the candle filter unit 200A, 200B, 200C is transitioned back to the filtration mode.

In embodiments, pulsing the plurality of filter candles 232 with the compressed gas 242 may comprise generating a compressed gas pulsation signal and communicating the compressed gas pulsation signal to the gas inlet control valve 320 on a compressed gas inlet 240 of the candle filter unit 200A, 200B, 200C. The compressed gas pulsation signal may cause the gas inlet control valve 320 to cycle between the open condition and the closed position for the plurality of alternating pulses and idle periods. In embodiments, the compressed gas pulsation signal may cause the gas inlet control valve 320 to remain in the open condition for a pulse duration of from 5 seconds to 30 seconds for each occurrence of the open condition, and remain the closed condition for a closed duration of from 5 seconds to 60 seconds during each of the idle periods. The modifications to the gas pulsation step of the cleaning cycle may improve removal of the solid filter cake from the outer surfaces of the filter candles 232, which may reduce the pressure differential across the candle filter unit 200 upon transitioning from the cleaning cycle back to the filtration mode.

Referring again to FIG. 5, after the gas pulsation step 514, the method for conducting a cleaning cycle for the candle filter units includes the sedimentation step 516. Referring again to FIG. 3, during sedimentation, the solid filter cake dislodged from the filter candles 232 are allowed to settle in the vessel 210 for a period of time prior to discharging the pieces of the solid filter cake from the vessel 210. In conventional operation of the candle filter system 130, the sedimentation step of the cleaning cycle is typically less than 30 minutes. However, it was found that a sedimentation duration of less than 30 minutes for the sedimentation step was insufficient to allow all the solids to settle in the bottom of the vessel 210 of the candle filter units 200 when using the candle filter system 130 to remove dissolved solids from the MEG rich stream 116. These solids remaining in the vessel 210 have to be filtered again using the candle filter unit 200 and end up deposited back onto the outer surfaces of the filter candles 232 when the candle filter unit 200 is transitioned back to filtration mode.

It was further found that settling and sedimentation of the solid filter cake pieces in the vessel 210 may be improved by increasing the sedimentation duration of the sedimentation step, which may reduce the residual solids remaining in the vessel 210 after removing the solid filter cake pieces from the vessel 210. Reducing the amount of residual solids remaining in the vessel 210 may reduce the concentration of solids in the candle filter unit 200 when transitioning the candle filter unit 200 back to filtration mode. In other words, increasing the sedimentation duration may reduce the quantity of solids that must be filtered again using the candle filter system 130. In embodiments, the sedimentation duration may be greater than or equal to 30 minutes, greater than or equal to 45 minutes, greater than or equal to 60 minutes, greater than or equal to 75 minutes, or greater than or equal to 90 minutes. In embodiments, the sedimentation duration may be from 30 minutes to 2 hours, such as from 30 minutes to 90 minutes, from 60 minutes to 2 hours, or from 60 minutes to 90 minutes.

Referring again to FIG. 5, in embodiments, the methods 510 for conducting a cleaning cycle of the present disclosure may include conducting one or more subsequent iteration of at least a portion of the cleaning cycle if the pressure differential across the candle filter unit 200 is still high, such as greater than or equal to about 480 kPa (about 70 psi). The subsequent iterations of the cleaning cycle may further improve removal of the solid filter cake from the filter candles, which may increase the separation efficiency of the candle filter unit 200 once the candle filter unit 200 is transitioned back to the filtration mode. Referring to FIGS. 3 and 5, in embodiments, the methods 510 for cleaning the one or more of the candle filter units 200 may include conducting an initial cleaning cycle; determining the pressure differential across the candle filter unit 200 as in step 520 in FIG. 5; and when the pressure differential across the candle filter unit 200 after the initial cleaning cycle is greater than a subsequent cleaning cycle PDI threshold of about 480 kPa (about 70 psi), about 530 kPa (about 77 psi), about 550 kPa (about 80 psi), or even about 565 kPa (about 82 psi), then conducting one or more subsequent cleaning cycles in succession. A differential pressure greater than about 69 kPa (about 10 psi) may indicate that at least portions of the outer surfaces of the filter candles 232 may still be covered with solid filter cake, indicating that a subsequent cleaning cycle may be needed. In embodiments, the method may include conducting one or more subsequent cleaning cycles in succession when the pressure differential across the candle filter unit 200 is greater than or equal to about 69 kPa (10 psi).

Referring again to FIG. 5 and step 520, determining the pressure differential across the candle filter unit 200 may be performed after the cake transfer step 518 of the initial cleaning cycle. Referring to FIG. 3, determining the pressure differential across the candle filter unit 200 may include pressurizing the vessel 210 of the candle filter unit 200 and measuring the inlet pressure in the vessel 210 on the inlet side of filter candles 232, measuring the outlet pressure on the downstream or outlet side of the filter candles 232, and determining the differential pressure from the inlet pressure and the outlet pressure. In embodiments, determining the differential pressure may include measuring the inlet pressure of the MEG rich stream 116 at the MEG stream inlet 220, measuring the outlet pressure of the MEG filtrate 132 at the filtrate outlet 222, and determining the differential pressure from the inlet pressure and the outlet pressure, where the differential pressure is the absolute value of the difference between the inlet pressure and the outlet pressure. In embodiments, the inlet pressure may be measured with the inlet pressure sensor 330. In embodiments, the outlet pressure may be measured with the filtrate outlet pressure sensor 332. In embodiments, determining the differential pressure may comprise directly measuring a pressure difference between the MEG filtrate 132 at the filtrate outlet 222 and the MEG rich stream 116 at the MEG stream inlet 220, such as by using a differential pressure transmitter.

Referring again to FIG. 5, conducting each of the one or more subsequent cleaning cycles may comprise repeating the gas pulsation step 514, followed by the sedimentation step 516, and then followed by the cake transfer step 518. Referring to FIG. 3, conducting each of the subsequent cleaning cycles may include pulsing the plurality of filter candles 232 with the compressed gas 242, wherein the pulsing causes separation of the solid filter cake from the outer surfaces of the filter candles 232. Conducting each of the subsequent cleaning cycles may further include allowing solids from the solid filter cake to settle in the bottom of the vessel 210 for a sedimentation duration and removing the solids from the vessel 210. In embodiments, when the pressure differential across the candle filter unit 200 after the initial cleaning cycle is less than the subsequent cleaning cycle PDI threshold, then a subsequent cleaning cycle may not be needed and the methods may include transitioning the candle filter unit 200 back to the filtration mode to resume filtering operations.

Referring again to FIG. 3, conducting the one or more subsequent cleaning cycles for the candle filter unit 200 may further comprise providing the user interface device 262 having an extra cleaning cycle user input 264, and activating the extra cleaning cycle user input 262. Activating the at least one extra cleaning cycle user input 262 may cause the candle filter system 130 to automatically conduct a subsequent cleaning cycle after the initial cleaning cycle. In embodiments, the candle filter control system 300 and user interface device 262 may be configured, such as through the computer readable and executable instructions, to only display the extra cleaning cycle user input 264 when the differential pressure is greater than or equal to the subsequent cleaning cycle PDI threshold. In embodiments, conducting the one or more subsequent cleaning cycles may further comprise displaying a message on the user interface device 262, where the message provides a recommendation for conducting a subsequent cleaning cycle based on the pressure differential after conducting the initial cleaning cycle. In embodiments, the machine readable and executable instructions 306, when executed by the processors 302, may cause the candle filter control system 300 to automatically determine the differential pressure across the filter candles 232 after the cake removal step 518 (FIG. 3) and, when the pressure differential is greater than the subsequent cleaning cycle DPI threshold, display a message on the user interface device 262 indicating that a subsequent cleaning cycle is recommended. The message may indicate which candle filter unit 200 may have a pressure differential greater than the subsequent cleaning cycle DPI threshold, such as greater than or equal to about 69 kPa (about 10 psi).

In embodiments, the machine the machine readable and executable instructions 306, when executed by the processors 302, may cause the candle filter control system 300 to automatically determine the differential pressure across the filter candles 232 after the cake removal step 518 (FIG. 3), and automatically conduct one or more subsequent cleaning cycles when the differential pressure is greater than the subsequent cleaning cycle DPI threshold. In other words, the candle filter control system 300 may be configured to automatically conduct the one or more subsequent cleaning cycles, when needed, without further input from the user interface device 262.

Following the cleaning cycle, and any subsequent cleaning cycles, the candle filter system 130 or one or more of the candle filter units 200 of the candle filter system 130 may be returned to the filtration mode. In embodiments, the methods may include determining a pressure differential across the filter candles 232 after the initial cleaning cycle or a subsequent cleaning cycle, and when the pressure differential is less than the subsequent cleaning cycle PDI threshold, transitioning the candle filter unit 200 from the cleaning cycle mode back to the filtration mode to resume filtering. In embodiments, the methods disclosed herein may include resuming filtration of the MEG rich stream 116 after the cleaning cycle or subsequent cleaning cycles.

In certain circumstances, such as when the incoming MEG rich stream 116 has high TDS or when the cleaning cycles did not remove all of the solid filter cake from the outer surfaces of the filter candles 232, the candle filter control system 300 may have a high pressure differential shutdown sequence. During the high pressure differential shutdown sequence, the candle filter control system 300 may identify a high pressure differential condition during start-up of a candle filter unit 200, such as a spike in pressure differential experienced while transitioning the candle filter unit 200 from the cleaning cycle mode to the filtration mode to begin filtering, and may shutdown the candle filter unit 200 or prevent the candle filter unit 200 from starting up in the filtration mode in response to the high pressure differential condition. When the high pressure differential shutdown occurs during start-up or during transitioning to the filtration mode, the candle filter unit 200 or the candle filter system 130 as a whole may be shut down and prevented from filtering. This can cause disruptions in the recovery of the MEG from the MEG rich stream 116. In some circumstances, such as when the spike in pressure differential is caused by high TDS of the MEG rich stream 116, shutdown of the candle filter system 130 or one of the candle filter units 200 may not be required.

In embodiments, the candle filter system 130 may comprise a start-up override, which may be operable to bypass the high pressure differential shutdown sequence automatically while transitioning one or more of the candle filter units 200 from the cleaning cycle mode to the filtration mode. Referring to FIGS. 1 and 3, in embodiments, resuming filtering operation of the one or more candle filter units 200 may comprise overriding the high pressure differential shutdown sequence. In embodiments, overriding the high pressure differential shutdown sequence may comprise verifying that sufficient volumes of MEG are present in downstream processes, such as but not limited to the MEG distillation column 142, the MEG reboiler 160, the lean MEG storage tank, or combinations of these; starting a filtration sequence or opening a filtrate control valve 312 on filtrate outlet 222 of the vessel 210 for one or more of the candle filter units 200A, 200B, 200C; determining that the pressure differential is greater than or equal to 70 psi (482 kPa); and bypassing the high differential pressure shutdown sequence.

The candle filter control system 300 may include a reboiler trip shutdown sequence. During operation of the candle filter system 130, certain downstream operating conditions, such as a reboiler trip alarm, may cause the candle filter system 130 to shutdown or fail to startup. This reboiler trip shutdown sequence may prevent the candle filter system 130 from operating or may prevent one or more candle filter units 200A, 200B, 200C from starting filtration mode. In embodiments, the candle filter control system 300 may comprise the reboiler trip override sequence, which may be operable to confirm that sufficient MEG is present in downstream systems and then, when sufficient MEG is present, overriding the reboiler trip shutdown sequence. The candle filter control system 300 may be communicatively coupled to one or more downstream sensors 350, which may be operable to send signals indicative of conditions of one or more downstream systems. The downstream sensors 350 may include but are not limited to one or more of an MEG level sensor in the MEG reboiler 160, a run dry sensor for the lean MEG pump 166, other sensor, or combinations thereof. The candle filter control system 300 may have machine readable and executable instructions 306 that, when executed by the processors 302, may cause the candle filter control system 300 to receive one or more control signals from the downstream sensors 350, confirm that sufficient MEG is in the downstream systems, and when sufficient MEG is present in the downstream systems, bypass the reboiler trip shutdown sequence.

Referring to FIG. 1, as previously discussed, the candle filter control system 300 may include the one or more processors 302 and one or more memory modules 304. The one or more processors 302 may include any device capable of executing computer-readable executable instructions stored on a non-transitory computer-readable medium. Accordingly, each processor 302 may include an integrated circuit, a microchip, a computer, and/or any other computing device. The one or more memory modules 304 are communicatively coupled to the one or more processors 302 over a communication path. The one or more memory modules 304 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. The one or more memory modules 304 may be configured to store machine readable and executable instructions 306 for operating one or more components of the candle filter system 130.

Embodiments of the present disclosure include logic stored on the one or more memory modules 304 that includes machine-readable and executable instructions or an algorithm written in any programming language of any generation (e.g., 1GL, 2GL, 3GL, 4GL, and/or 5GL) such as, machine language that may be directly executed by the one or more processors 302, assembly language, obstacle-oriented programming (OOP), scripting languages, microcode, etc., that may be compiled or assembled into machine readable instructions and stored on a machine readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components.

In a first aspect of the present disclosure, method of operating a candle filter system for removing solids from monoethylene glycol (MEG) recovered from drilling fluids may comprise passing an MEG rich stream to a candle filter system comprising a plurality of candle filter units operated in parallel and a slurry vessel disposed downstream of the candle filter system. The MEG rich stream may comprise at least the MEG and dissolved solids and each of the plurality of candle filter units comprises a vessel, a register, and a plurality of filter candles fluidly coupled to the register. The method may further comprise determining a concentration of total dissolved solids in the MEG rich stream, determining whether to operate the candle filter system in a low TDS mode or a high TDS mode based on the concentration of total dissolved solids (TDS) in the MEG rich stream, filtering the MEG rich stream in the plurality of candle filter units to produce a filtrate and a filter cake deposited on outer surfaces of the filter candles of the candle filter units, determining to conduct a cleaning cycle for one or more of the plurality of candle filter units based on a pressure differential across the plurality of candle filter units, and conducting a cleaning cycle to remove the filter cake from the outer surfaces of the filter candles. Conducting the cleaning cycle my comprise reducing a pressure in the one or more candle filter units; draining a residual volume of the MEG rich stream all the way to the slurry vessel disposed downstream of the candle filter system; after the draining, pulsing the plurality of filter candles with a compressed gas, where the pulsing causes separation of the solid filter cake from the outer surfaces of the filter candles; allowing solids from the solid filter cake to settle in a bottom of the vessel for a sedimentation duration; and removing the solids from the vessel. The method may further include resuming filtering operation of the one or more candle filter units.

A second aspect of the present disclosure may include the first aspect, where the determining a concentration of total dissolved solids in the MEG rich stream may comprise measuring the concentration of total dissolved solids (TDS) in the MEG rich stream.

A third aspect of the present disclosure may include either one of the first or second aspects, where whether to operate the candle filter system in a low TDS mode or a high TDS mode may comprises: when the concentration of TDS in the MEG rich stream is less than a threshold concentration, then operating the candle filter system in the low TDS mode; and when the concentration of total dissolved solids in the MEG rich stream is greater than or equal to the threshold concentration, then operating each of the plurality of candle filter units in the high TDS mode.

A fourth aspect of the present disclosure may include any one of the first through third aspects, comprising operating the candle filter system in the low TDS mode, where in the low TDS mode, the candle filter system may be operated in a swing mode in which at least a first candle filter unit is operating in a filtering mode, and a second candle filter unit is in a standby mode. When the at least one first candle filter in filtering mode reaches a high pressure differential condition, the at least one first candle filter unit may be transitioned to cleaning mode while the second candle filter unit is transitioned to filtering mode. The method may further comprise, following conducting the cleaning cycle on the at least one first candle filter unit, transitioning the first candle filter unit to the standby mode.

A fifth aspect of the present disclosure may include any one of the first through fourth aspects, comprising operating the candle filter system in the high TDS mode, where in the high TDS mode, the candle filter system may be operated with each of the candle filters in a filtering mode and none of the candle filter units in the standby mode.

A sixth aspect of the present disclosure may include the fifth aspect, where in the high TDS mode, each of the candle filter units may be operated in parallel at 100% capacity or at 50% capacity.

A seventh aspect of the present disclosure may include any one of the first through sixth aspects, comprising, in the low TDS mode, operating each of the candle filter units of the candle filter system at 100%, and in the high TDS mode, operating each of the candle filter units at 50%.

An eighth aspect of the present disclosure may include any one of the first through seventh aspects, where the pulsing the plurality of filter candles with the compressed gas may comprise generating a compressed gas pulsation signal, and communicating the compressed gas pulsation signal to a gas inlet control valve on a compressed gas inlet of the one or more candle filter units, where the compressed gas pulsation signal may cause the gas inlet control valve to cycle between an open condition and a closed position for to produce a plurality of alternating pulses and idle periods.

A ninth aspect of the present disclosure may include the eighth aspect, where the compressed gas pulsation signal may cause the compressed gas control valve to remain in the open condition for an open duration of from 5 seconds to 30 seconds for each occurrence of the open condition, and remain the closed condition for a closed duration of from 5 seconds to 60 seconds during each open-close cycles.

A tenth aspect of the present disclosure may include any one of the first through ninth aspects, where the compressed gas may be nitrogen gas.

An eleventh aspect of the present disclosure may include any one of the first through tenth aspects, where the pressure of the compressed gas may be from 275 kPa to 400 kPa absolute pressure.

A twelfth aspect of the present disclosure may include any one of the first through eleventh aspects, comprising pulsing the plurality of filter candles with the compressed gas for a total pulsation duration of greater than or equal to 10 minutes.

A thirteenth aspect of the present disclosure may include any one of the first through twelfth aspects, where the sedimentation duration may be greater than or equal to 30 minutes.

A fourteenth aspect of the present disclosure may include any one of the first through thirteenth aspects, further comprising conducting an initial cleaning cycle and measuring the pressure differential across the candle filter unit, where the pressure differential is indicative of a difference between an inlet pressure of the MEG rich stream at an MEG stream inlet and an outlet pressure of the filtrate at a filtrate outlet. The method may further comprise, when the pressure differential across the candle filter unit after the first cleaning cycle is greater than 69 kPa (10 psi), then conducting one or more subsequent cleaning cycles in succession.

A fifteenth aspect of the present disclosure may include the fourteenth aspect, where conducting each of the one or more subsequent cleaning cycles may comprise repeating the steps of pulsing the plurality of filter candles with a compressed gas, wherein the pulsing causes separation of the solid filter cake from the outer surfaces of the filter candles; allowing solids from the solid filter cake to settle in a bottom of the vessel for a sedimentation duration; and removing the solids from the vessel.

A sixteenth aspect of the present disclosure may include either one of the fourteenth or fifteenth aspects, where when the pressure differential across the candle filter unit after the initial cleaning cycle is less than 69 kPa (about 10 psi), transitioning the candle filter unit to a filtering mode to resume filtering operations.

A seventeenth aspect of the present disclosure may include any one of the fourteenth through sixteenth aspects, where conducting the one or more subsequent cleaning cycles may comprise providing a user interface device having an extra cleaning cycle user input and activating the extra cleaning cycle user input. Activating the at least one extra cleaning cycle user input may cause the candle filter system to automatically conduct the one or more subsequent cleaning cycles after the initial cleaning cycle.

An eighteenth aspect of the present disclosure may include the seventeenth aspect, where conducting the one or more subsequent cleaning cycles further may comprise displaying a message on the user interface device, where the message may provide a recommendation for conducting a subsequent cleaning cycle based on the pressure differential after conducting the first cleaning cycle.

A nineteenth aspect of the present disclosure may include any one of the first through eighteenth aspects, where resuming filtering operation of the one or more candle filter units may comprise overriding a high pressure differential shutdown sequence.

A twentieth aspect of the present disclosure may include the nineteenth aspect, where overriding the high pressure differential shutdown sequence may comprise verifying that sufficient volumes of MEG are present in downstream processes; starting a filtration sequence or opening a filtrate control valve on filtrate outlet of the vessel; determining that the pressure differential is greater than or equal to 70 psi (482 kPa); and bypassing the high differential pressure shutdown sequence.

A twenty-first aspect of the present disclosure may include any one of the first through twentieth aspects, where determining to conduct a cleaning cycle for one or more of the plurality of candle filter units may comprise measuring a pressure differential across the plurality of candle filter units and determining to conduct the cleaning cycle when the pressure differential across the plurality of candle filter units is greater than a threshold pressure differential.

A twenty second aspect of the present disclosure may include the twenty-first aspect, where the threshold pressure differential is 70 psi, 75 psi, 77 psi, or even 80 psi.

Examples

The various aspects of the present disclosure will be further clarified by the following examples. The examples are illustrative in nature and should not be understood to limit the subject matter of the present disclosure.

Figure 6:
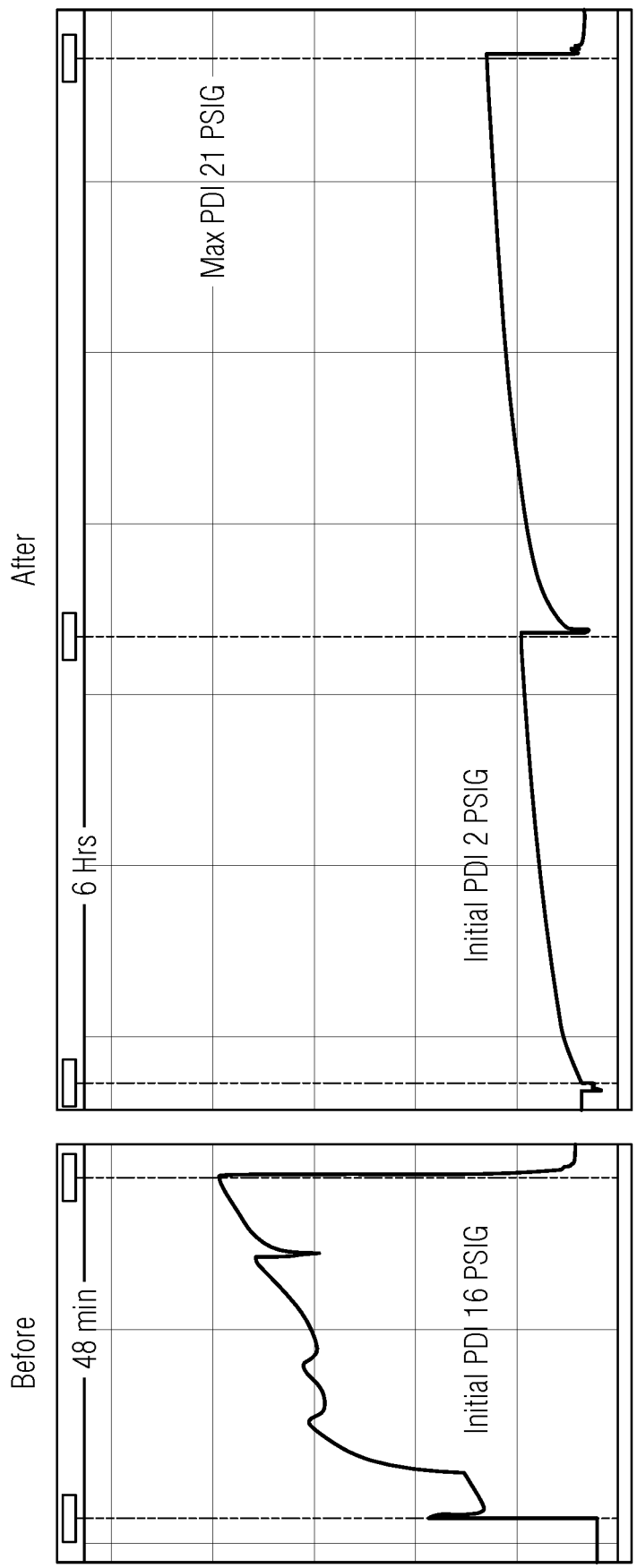
FIG. 6 graphically depicts a differential pressure (PDI) (y-axis) as a function of time (x-axis) for operation of a candle filter system using the method of FIG. 4, according to one or more aspects shown and described in the present disclosure.

An MEG rich stream having a constant concentration of total dissolved solids was introduced to a candle filter system having 3 candle filter units as shown in FIG. 3. The candle filter system was operated at a constant overall flow rate through the candle filter system. The candle filter system was first operated in a normal operating mode, such as a low TDS mode, in which the MEG rich stream was filtered through two of the candle filter units while the third candle filter unit was maintained in a standby condition pending one of the other two candle filter units having to switch to a cleaning mode. In the low TDS mode, the total flow through the candle filter system was divided between the two candle filter units operating in filtration mode. Referring now to FIG. 6, during low TDS mode of operation, the candle filter system experienced an initial pressure differential (PDI) across the candle filter system of 16 psig (110 kPa gauge pressure), which rapidly increased to close to 74 psig (510 kPa gauge pressure) in 48 minutes, at which point the candle filter system had to be shut down manually for cleaning.

After a cleaning cycle, the operation of the candle filter system was then restarted in the high TDS operating mode. In the high TDS mode, the candle filter system was operated with all three candle filter units in filtration mode, and the overall flow rate through the candle filter unit was divided between the three candle filter units. Referring to FIG. 6, when operated in high TDS mode, the overall pressure differential across the candle filter system was about 2 psig (14 kPa gauge pressure) initially. Over a period of about six hours, the pressure differential across the candle filter system only increased to a maximum pressure of 21 psig (145 kPa gauge pressure). In the high TDS operating mode, the candle filter system was able to be operated continuously for more than about 14 hours before requiring shutdown for cleaning the solids from the filter candles. This demonstrates that the new high TDS operating mode can greatly increase the total run time of the candle filter system when filtering MEG rich stream having high TDS.

It is noted that any two quantitative values assigned to a property may constitute a range of that property, and all combinations of ranges formed from all stated quantitative values of a given property are contemplated in this disclosure.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Having described the subject matter of the present disclosure in detail and by reference to specific aspects, it is noted that the various details of such aspects should not be taken to imply that these details are essential components of the aspects. Rather, the claims appended hereto should be taken as the sole representation of the breadth of the present disclosure and the corresponding scope of the various aspects described in this disclosure. Further, it will be apparent that modifications and variations are possible without departing from the scope of the appended claims.

What is claimed is:

1. A method of operating a candle filter system for removing solids from monoethylene glycol (MEG) recovered from drilling fluids, the method comprising:
    passing an MEG rich stream to a candle filter system comprising a plurality of candle filter units operated in parallel and a slurry vessel disposed downstream of the candle filter system, wherein the MEG rich stream comprises at least the MEG and dissolved solids and each of the plurality of candle filter units comprises a vessel, a register, and a plurality of filter candles fluidly coupled to the register;
    determining a concentration of total dissolved solids in the MEG rich stream;
    determining whether to operate the candle filter system in a low TDS mode or a high TDS mode based on the concentration of total dissolved solids (TDS) in the MEG rich stream;
    filtering the MEG rich stream in the plurality of candle filter units to produce a filtrate and a filter cake deposited on outer surfaces of the filter candles of the candle filter units;
    determining to conduct a cleaning cycle for one or more of the plurality of candle filter units based on a pressure differential across the plurality of candle filter units; and
    conducting a cleaning cycle to remove the filter cake from the outer surfaces of the filter candles, where conducting the cleaning cycle comprises:
        reducing a pressure in the one or more candle filter units;

draining a residual volume of the MEG rich stream all the way to the slurry vessel disposed downstream of the candle filter system;

after the draining, pulsing the plurality of filter candles with a compressed gas, where the pulsing causes separation of the solid filter cake from the outer surfaces of the filter candles;

allowing solids from the solid filter cake to settle in a bottom of the vessel for a sedimentation duration; and removing the solids from the vessel; and resuming filtering operation of the one or more candle filter units.

2. The method of claim 1, where the determining a concentration of total dissolved solids in the MEG rich stream comprises measuring the concentration of total dissolved solids (TDS) in the MEG rich stream.

3. The method of claim 1, where whether to operate the candle filter system in a low TDS mode or a high TDS mode comprises:

when the concentration of TDS in the MEG rich stream is less than a threshold concentration, then operating the candle filter system in the low TDS mode; and when the concentration of total dissolved solids in the MEG rich stream is greater than or equal to the threshold concentration, then operating each of the plurality of candle filter units in the high TDS mode.

4. The method of claim 1, comprising operating the candle filter system in the low TDS mode, where in the low TDS mode, the candle filter system is operated in a swing mode in which at least a first candle filter unit is operating in a filtering mode, and a second candle filter unit is in a standby mode, where:

when the at least one first candle filter in filtering mode reaches a high pressure differential condition, the at least one first candle filter unit is transitioned to cleaning mode while the second candle filter unit is transitioned to filtering mode, and following conducting the cleaning cycle on the at least one first candle filter unit, transitioning the first candle filter unit to the standby mode.

5. The method of claim 1, comprising operating the candle filter system in the high TDS mode, where in the high TDS mode, the candle filter system is operated with each of the candle filters in a filtering mode and none of the candle filter units in the standby mode.

6. The method of claim 5, where in the high TDS mode, each of the candle filter units are operated in parallel at 100% capacity or at 50% capacity.

7. The method of claim 1, comprising:

in the low TDS mode, operating each of the candle filter units of the candle filter system at 100%; and in the high TDS mode, operating each of the candle filter units at 50%.

8. The method of claim 1, where the pulsing the plurality of filter candles with the compressed gas comprises:

generating a compressed gas pulsation signal; and communicating the compressed gas pulsation signal to a gas inlet control valve on a compressed gas inlet of the one or more candle filter units, where the compressed gas pulsation signal causes the gas inlet control valve to cycle between an open condition and a closed position for to produce a plurality of alternating pulses and idle periods.

9. The method of claim 8, where the compressed gas pulsation signal causes the compressed gas control valve to remain in the open condition for an open duration of from 5 seconds to 30 seconds for each occurrence of the open condition, and remain the closed condition for a closed duration of from 5 seconds to 60 seconds during each open-close cycles.

10. The method of claim 1, where the pressure of the compressed gas is from 275 kPa to 400 kPa absolute pressure.

11. The method of claim 1, comprising pulsing the plurality of filter candles with the compressed gas for a total pulsation duration of greater than or equal to 10 minutes.

12. The method of claim 1, where the sedimentation duration is greater than or equal to 30 minutes.

13. The method of claim 1, further comprising:

conducting an initial cleaning cycle;

measuring the pressure differential across the candle filter unit, where the pressure differential is indicative of a difference between an inlet pressure of the MEG rich stream at an MEG stream inlet and an outlet pressure of the filtrate at a filtrate outlet; and when the pressure differential across the candle filter unit after the first cleaning cycle is greater than 69 kPa, then conducting one or more subsequent cleaning cycles in succession.

14. The method of claim 13, where conducting each of the one or more subsequent cleaning cycles comprises repeating the steps of:

pulsing the plurality of filter candles with a compressed gas, wherein the pulsing causes separation of the solid filter cake from the outer surfaces of the filter candles;

allowing solids from the solid filter cake to settle in a bottom of the vessel for a sedimentation duration; and removing the solids from the vessel.

15. The method of claim 13, where when the pressure differential across the candle filter unit after the initial cleaning cycle is less than 69 kPa, transitioning the candle filter unit to a filtering mode to resume filtering operations.

16. The method of claim 13, where conducting the one or more subsequent cleaning cycles comprises:

providing a user interface device having an extra cleaning cycle user input; and activating the extra cleaning cycle user input, where activating the at least one extra cleaning cycle user input causes the candle filter system to automatically conduct the one or more subsequent cleaning cycles after the initial cleaning cycle.

17. The method of claim 16, where conducting the one or more subsequent cleaning cycles further comprises displaying a message on the user interface device, where the message provides a recommendation for conducting a subsequent cleaning cycle based on the pressure differential after conducting the first cleaning cycle.

18. The method of claim 1, where resuming filtering operation of the one or more candle filter units comprises overriding a high pressure differential shutdown sequence.

19. The method of claim 18, where overriding the high pressure differential shutdown sequence comprises:

verifying that sufficient volumes of MEG are present in downstream processes;

starting a filtration sequence or opening a filtrate control valve on filtrate outlet of the vessel;

determining that the pressure differential is greater than or equal to 70 psi (482 kPa); and bypassing the high differential pressure shutdown sequence.

20. The method of claim 1, where determining to conduct a cleaning cycle for one or more of the plurality of candle filter units comprises:

measuring a pressure differential across the plurality of candle filter units; and determining to conduct the cleaning cycle when the pressure differential across the plurality of candle filter units is greater than a threshold pressure differential, where the threshold pressure differential is 70 psi.

\* \* \* \* \*